United States Patent
Xu et al.

(10) Patent No.: US 12,034,654 B2
(45) Date of Patent: Jul. 9, 2024

(54) DATA REASSEMBLY METHOD AND APPARATUS

(71) Applicant: HUAWEI TECHNOLOGIES CO., LTD., Guangdong (CN)

(72) Inventors: Enqi Xu, Shenzhen (CN); Yilin Ning, Shenzhen (CN); Jinrong Yin, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/742,394

(22) Filed: May 11, 2022

(65) Prior Publication Data

US 2022/0272053 A1 Aug. 25, 2022

Related U.S. Application Data

(63) Continuation of application No. PCT/CN2020/117073, filed on Sep. 23, 2020.

(30) Foreign Application Priority Data

Nov. 12, 2019 (CN) .......................... 201911101796.9

(51) Int. Cl.
*H04L 49/90* (2022.01)
*H04B 10/2507* (2013.01)
(Continued)

(52) U.S. Cl.
CPC ..... *H04L 49/9057* (2013.01); *H04B 10/2507* (2013.01); *H04L 47/34* (2013.01); *H04L 49/9005* (2013.01); *H04L 49/9084* (2013.01)

(58) Field of Classification Search
CPC ............. H04L 49/9057; H04L 49/9005; H04L 65/40; H04L 67/5651; H04L 67/568;
(Continued)

(56) References Cited

U.S. PATENT DOCUMENTS

| | | | | |
|---|---|---|---|---|
| 8,255,567 B2* | 8/2012 | Mizrachi | ................. | H04L 47/34 709/201 |
| 9,998,434 B2* | 6/2018 | Verzun | .................. | H04L 63/102 |
| 11,411,892 B2* | 8/2022 | Luo | ........................ | H04L 69/166 |

(Continued)

FOREIGN PATENT DOCUMENTS

| | | |
|---|---|---|
| CN | 1984051 A | 6/2007 |
| CN | 101902274 A | 12/2010 |

(Continued)

OTHER PUBLICATIONS

Chen ting, Solution of IP Multicast Service in GPON System, 4 pages (with an English abstract).

(Continued)

*Primary Examiner* — Mounir Moutaouakil

(74) *Attorney, Agent, or Firm* — James Harrison

(57) ABSTRACT

This application provides a data reassembly method and an apparatus, to reassemble packet fragments in combination with local reassembly and cloud reassembly, so as to obtain a reassembled packet. This improves reassembly efficiency, reduces a packet reassembly delay, and reduces power consumption of an OLT. The method includes: a first OLT receives a plurality of packet fragments of a first packet that are sent by an optical network unit ONU; and if the first OLT determines that an upload condition is met, the first OLT sends the plurality of packet fragments to a cloud reassembly device, so that after receiving the plurality of packet fragments, the cloud reassembly device reassembles the plurality of packet fragments to obtain a second packet.

14 Claims, 13 Drawing Sheets

(51) Int. Cl.
  *H04L 47/34* (2022.01)
  *H04L 49/9005* (2022.01)
  *H04L 49/9057* (2022.01)
(58) Field of Classification Search
  CPC ............... H04L 47/34; H04L 49/9084; H04L 12/2861; H04L 47/36; H04L 69/166; H04L 49/068; H04L 47/30; H04L 49/3009; H04L 49/901; H04L 69/22; H04B 10/2507; H04Q 2011/0064; H04Q 2213/1301; H04Q 11/0067
  See application file for complete search history.

(56) References Cited

U.S. PATENT DOCUMENTS

| | | | |
|---|---|---|---|
| 2003/0056009 A1 | 3/2003 | Mizrachi et al. | |
| 2007/0140288 A1 | 6/2007 | Boyd et al. | |
| 2013/0322465 A1* | 12/2013 | Way | H04L 47/36 370/474 |
| 2013/0336320 A1* | 12/2013 | Rangaraman | H04L 45/38 370/392 |
| 2014/0047188 A1* | 2/2014 | Xia | H04L 67/5682 711/133 |
| 2016/0050140 A1* | 2/2016 | Chinni | H04L 47/34 709/242 |
| 2021/0014179 A1* | 1/2021 | Luo | H04L 49/9084 |

FOREIGN PATENT DOCUMENTS

| | | | | |
|---|---|---|---|---|
| CN | 103152292 A | 6/2013 | | |
| CN | 103378979 A | 10/2013 | | |
| CN | 106685591 A | 5/2017 | | |
| CN | 107302397 A | 10/2017 | | |
| EP | 2618508 A1 | 7/2013 | | |
| WO | WO-2019178813 A1 * | 9/2019 | | H04L 47/34 |

OTHER PUBLICATIONS

3GPP TR 32.833 V0.6.0 (Jun. 2011), 3rd Generation Partnership Project; Technical Specification Group Services and System Aspects; Telecommunication management; Study on Management of Converged Networks (Release 10), 27 pages.

* cited by examiner

Ethernet encapsulation

User-defined encapsulation

DATA REASSEMBLY METHOD AND APPARATUS

CROSS-REFERENCE TO RELATED APPLICATIONS

This application is a continuation of International Application No. PCT/CN2020/117073, filed on Sep. 23, 2020, which claims priority to Chinese Patent Application No. 201911101796.9, filed on Nov. 12, 2019. The disclosures of the aforementioned applications are hereby incorporated by reference in their entireties.

TECHNICAL FIELD

This application relates to the communications field, and in particular, to a data reassembly method and an apparatus.

BACKGROUND

A passive optical network (PON) system includes devices such as an optical line terminal (OLT), an optical distribution network (ODN), and an optical network unit (ONU). A first OLT may generally be connected to a plurality of ONUs, and the plurality of ONUs may send data to the OLT in different slots. Therefore, usually the ONU may split one packet into a plurality of packet fragmentsfragments and send them to the OLT. After receiving the plurality of packet fragmentsfragments, the OLT needs to reassemble the plurality of packet fragmentsfragments to obtain a reassembled packet.

In an existing solution, reassembly is performed in a manner of combining a channel request block (CRB) and a double data rate (DDR) memory. For example, CRB reassembly may be performed preferentially, and when usage of the CRB exceeds a limit, CRB reassembly is switched to DDR reassembly for packet fragmentsfragments.

However, when reassembly is performed in combination with the CRB and the DDR, using DDR reassembly causes DDR bandwidth occupation, and access of packet fragmentsfragments to the DDR memory causes relatively high power consumption of the OLT, and a delay of access of data to the DDR memory is also relatively large. Especially when a data amount is large, access of a large amount of data to the DDR memory greatly increases power consumption and a delay of the OLT.

SUMMARY

This application provides a data reassembly method and an apparatus, to reassemble packet fragments in combination with local reassembly and cloud reassembly, so as to obtain a reassembled packet. This improves reassembly efficiency, reduces a packet reassembly delay, and reduces power consumption of a first OLT.

In view of this, a first aspect of this application provides a data reassembly method, including:

a first OLT receives a plurality of packet fragments of a first packet that are sent by an optical network unit ONU; and if the first OLT determines that an upload condition is met, the first OLT sends the plurality of packet fragments to a cloud reassembly device, so that after receiving the plurality of packet fragments, the cloud reassembly device reassembles the plurality of packet fragments to obtain a second packet.

In this application, the first OLT may receive a plurality of packet fragments of the first packet, and when determining that the upload condition is met, the first OLT sends the plurality of packet fragments to the cloud reassembly device for reassembly. Therefore, packet fragments may be reassembled in the cloud reassembly device to reduce an amount of data reassembled in the DDR memory, so as to reduce a delay caused by access of packet fragments to the DDR memory, and reduce power consumption of the first OLT.

In an optional implementation, the method may further include:

if the first OLT determines that the upload condition is not met, the first OLT reassembles the plurality of packet fragments to obtain a second packet. The first packet and the second packet may be the same or may be different, which specifically may be adjusted based on an actual application scenario.

In this implementation of this application, when reassembly information does not meet the upload condition, the plurality of packet fragments are locally reassembled to obtain a complete second packet. Therefore, the first OLT can pick out, by using the upload condition, a packet that needs to be reassembled by the cloud reassembly device, and send packet fragments that meet the upload condition to the cloud reassembly device for reassembly. Only packet fragments that do not meet the upload condition are reassembled locally in the first OLT. This reduces a data amount of packet fragments reassembled locally in the first OLT, and reduces access of packet fragments to a DDR memory, thereby reducing a delay caused by access of packet fragments to the DDR memory, and reducing power consumption of the first OLT.

In an optional implementation, if the upload condition is not met, the first OLT may reassemble the plurality of packet fragments in a local CRB, to obtain a complete second packet.

Therefore, in this implementation of this application, during local reassembly of the plurality of packet fragments in the first OLT, the packet fragments may be reassembled in the local CRB without a need of reassembly in the DDR memory, and access of to-be-reassembled packet fragments to the DDR memory is not required. This reduces a delay of access of packet fragments to the DDR memory, improves efficiency in reassembling the to-be-reassembled packet fragments, reduces bandwidth occupation of the DDR memory, and improves processing efficiency of other data in the DDR memory.

In an optional implementation, that the first OLT determines that an upload condition is met may include: the first OLT obtains information about the first packet; and the first OLT determines that the information about the first packet meets a first preset condition.

Therefore, in this implementation of this application, whether to send the plurality of packet fragments of the first packet to the cloud reassembly device for reassembly can be determined based on whether the information about the first packet meets the first preset condition. This reduces a data amount of packet fragments reassembled locally in the first OLT, and reduces access of packet fragments to the DDR memory, thereby reducing a delay caused by access of packet fragments to the DDR memory, and reducing power consumption of the first OLT.

In an optional implementation, the information about the first packet includes one or more of the following: identification information of a transmission container TCONT corresponding to the first packet, packet type information of the first packet, length information of the plurality of packet fragments, or length information of the first packet.

The first preset condition includes one or more of the following: an identifier corresponding to the transmission container TCONT corresponding to the first packet includes a cloud reassembly flag, a type of the first packet is not a management packet, a length of any fragmented packet in the plurality of packet fragments is greater than a first preset length, or a length of the first packet is greater than a second preset length.

Therefore, in this implementation of this application, because whether to send the plurality of packet fragments to the cloud reassembly device for reassembly can be determined based on more detailed information of the first packet, whether to send the plurality of packet fragments to the cloud reassembly device for reassembly can be determined more accurately.

In an optional implementation, that the first OLT determines that an upload condition is met may further include: the first OLT determines that information about a first reassembly resource of the first OLT meets a second preset condition.

In this implementation of this application, whether to send the plurality of packet fragments of the first packet to the cloud reassembly device for reassembly can be determined based on whether the information about the first reassembly resource of the first OLT meets the second preset condition, so that when load of the first OLT is relatively heavy, the plurality of packet fragments can be sent to the cloud reassembly device for reassembly. This reduces the load of the first OLT, reduces a data amount of packet fragments reassembled locally in the first OLT, and reduces access of packet fragments to the DDR memory, thereby reducing a delay caused by access of packet fragments to the DDR memory, and reducing power consumption of the first OLT.

In an optional implementation, the second preset condition may include:
  reassembly resource usage of the first OLT is greater than a first threshold, or a buffer resource of the first OLT is less than a second threshold.

In this implementation of this application, if the reassembly resource usage of the first OLT is greater than the first threshold, it can be understood as: the reassembly resource usage of the first OLT is relatively high, and a relatively large amount of data is reassembled locally in the first OLT. Alternatively, if the buffer resource of the first OLT is less than the second threshold, it can be understood as: the first OLT has relatively few available reassembly resources. The plurality of packet fragments can be sent to the cloud reassembly device for reassembly, to reduce a reassembly data amount of the first OLT, improve work efficiency of the first OLT, and improve reassembly efficiency of the plurality of packet fragments.

In an optional implementation, that the first OLT determines that an upload condition is met may further include: the first OLT determines that a current time period is a peak time period.

In this implementation of this application, the plurality of packet fragments can be sent to the cloud reassembly device in the peak time period in a timely manner for reassembly, to reduce a data reassembly amount of the first OLT, and improve data reassembly efficiency of the first OLT.

In an optional implementation, the peak time period is obtained based on one or more of the following: historical usage information of each TCONT of one or more TCONTs connected to the first OLT, a historical resource consumption status of the first OLT, or received information about the peak time period.

In this implementation of this application, the peak time period may be determined based on the historical usage information of the TCONT of the first OLT, the historical resource consumption status of the first OLT, the received information about the peak time period, or the like, so that a peak time period of resource usage of the first OLT can be accurately obtained through analysis. In this way, the plurality of packet fragments are sent to the cloud reassembly device in the peak time period in a timely manner for reassembly, to reduce a data assembly amount of the first OLT, and improve data reassembly efficiency of the first OLT.

In an optional implementation, that the first OLT determines that an upload condition is met may further include: the first OLT determines that indication information sent by the OLT control and management entity is received, where the indication information is used to indicate the first OLT to send the plurality of packet fragments to the cloud reassembly device.

In this implementation of this application, the first OLT may determine, based on the indication information sent by the OLT control and management entity, whether to send the plurality of packet fragments of the first packet to the cloud reassembly device for reassembly. The OLT control and management entity can adjust a fragmented packet reassembly device by using the indication information, to balance load between the first OLT and the cloud reassembly device in a timely manner, and improve data reassembly efficiency of the first OLT and the cloud reassembly device.

In an optional implementation, before the first OLT receives the indication information sent by the OLT control and management entity, the method may further include: the first OLT sends the information about the first reassembly resource to the OLT control and management entity.

In this implementation of this application, the first OLT may send the information about the first reassembly resource to the OLT control and management entity, and the OLT control and management entity determines whether the plurality of packet fragments of the first packet need to be sent to the cloud reassembly device for reassembly, to reduce workload of the first OLT, and implement management on the first OLT by the OLT control and management entity.

In an optional implementation, that the first OLT sends the plurality of packet fragments to the cloud reassembly device may include:
  the first OLT adds preset headers to the plurality of packet fragments, and sends, to the cloud reassembly device, a plurality of packet fragments added with the preset headers, where the preset headers include information about the plurality of packet fragments.

In this implementation of this application, before sending the plurality of packet fragments to the cloud reassembly device, the first OLT may add the preset header to each fragmented packet, where the preset header of each fragmented packet includes information about each fragmented packet. In this way, the cloud reassembly device can obtain the information about the plurality of packet fragments in a timely manner by using the preset header, and the cloud reassembly device does not need to obtain information about the plurality of packet fragments by reading specific content of the plurality of packet fragments, to improve efficiency of the cloud reassembly device in obtaining the information about the plurality of packet fragments.

A second aspect of this application provides a data reassembly method, including:

a cloud reassembly device receives a plurality of packet fragments that are sent by a first OLT, where the plurality of packet fragments are sent to the cloud reassembly device after the first OLT determines that an upload condition is met; and the cloud reassembly device reassembles the plurality of packet fragments to obtain a second packet.

In this implementation of this application, after receiving the plurality of packet fragments sent by the first OLT, the cloud reassembly device may reassemble the plurality of packet fragments to obtain a complete second packet. This can reduce an amount of data reassembled in a DDR memory of the first OLT, reduce a delay caused by access of packet fragments to the DDR memory, and reduce power consumption of the first OLT.

In an optional implementation, the method may further include: if the cloud reassembly device determines that the plurality of packet fragments of the first packet are not completely received, the cloud reassembly device stores a plurality of packet fragments.

In this implementation of this application, if the cloud reassembly device has not completely received the plurality of packets of the first packet, the cloud reassembly device may store the received fragmented packet, and reassemble the plurality of packet fragments only after all the plurality of packet fragments are received, to obtain a complete second packet.

In an optional implementation, the method may further include: the cloud reassembly device sends information about a second reassembly resource of the cloud reassembly device to an OLT control and management entity.

In this implementation of this application, the cloud reassembly device may further send the information about the second reassembly resource to the OLT control and management entity, so that the OLT control and management entity determines, based on the information about the second reassembly resource, whether the first OLT needs to send the packet fragments to the cloud reassembly device for reassembly, or whether capacity expansion needs to be performed for the cloud reassembly device, or the like. In this way, the OLT control and management entity can learn a resource usage status of the cloud reassembly device in a timely manner, and adjust a fragmented packet reassembly manner in a timely manner, to improve efficiency in reassembling packet fragments.

A third aspect of this application provides a data reassembly method, including:

an OLT control and management entity obtains information about a second reassembly resource of a cloud reassembly device; the OLT control and management entity generates indication information based on the information about the second reassembly resource; and the OLT control and management entity sends the indication information to a first OLT, where the indication information is used to indicate the first OLT to send a plurality of received packet fragments of a first packet to the cloud reassembly device, so that the cloud reassembly device reassembles the plurality of packet fragments to obtain a second packet.

In this implementation of this application, the first OLT may obtain the information about the second reassembly resource of the cloud reassembly device, and determine, based on the information about the second reassembly resource, whether the plurality of packet fragments of the first packet need to be sent to the cloud reassembly device for reassembly. If the plurality of packet fragments need to be sent to the cloud reassembly device for reassembly, the OLT control and management entity generates the indication information, and indicates, by using the indication information, to send the plurality of packet fragments to the cloud reassembly device for reassembly, to reduce an amount of data reassembled locally in the first OLT. Especially when available reassembly resources of the cloud reassembly device are robust, the plurality of packet fragments can be sent to the cloud reassembly device for reassembly, and the cloud reassembly device can reassemble the plurality of packet fragments in a timer manner, to improve efficiency in reassembling packet fragments.

In an optional implementation, the method may further include: the OLT control and management entity receives information about a first reassembly resource sent by the first OLT, where the information about the first reassembly resource includes information about a resource usage status of the first OLT; and that the OLT control and management entity sends the indication information to a first OLT may include: the OLT control and management entity generates the indication information based on the information about the first reassembly resource and the information about the second reassembly resource.

In this implementation of this application, the OLT control and management entity may further receive the information about the first reassembly resource sent by the first OLT, and determine, with reference to the information about the first reassembly resource of the first OLT and the information about the second reassembly resource of the cloud reassembly device, whether to reassemble the plurality of packet fragments in the cloud reassembly device. The first OLT control and management entity, may determine a reassembly resource usage status or an available reassembly resource status of the first OLT based on the information about the first reassembly resource, and determine a reassembly resource usage status or an available reassembly resource status of the cloud reassembly device based on the information about the second reassembly resource. In this way, the OLT control and management entity can adjust a fragmented packet reassembly manner in a timely manner, to improve efficiency in reassembling packet fragments, and can balance load between the first OLT and the cloud reassembly device, to further improve efficiency in reassembling packet fragments.

In an optional implementation, the method may further include:

the OLT control and management entity generates alarm prompt information when the OLT control and management entity determines, based on the information about the second reassembly resource, that a used resource exceeds a third threshold, where the alarm prompt information is used to prompt that the used resource of the cloud reassembly device exceeds the third threshold.

In this implementation of this application, the OLT control and management entity may generate the alarm prompt information in a timely manner when the OLT control and management entity determines, based on the information about the second reassembly resource, that the information about the used resource of the cloud reassembly device exceeds the third threshold, to prompt that resource usage of the cloud reassembly device is too high. In this way, a user can expand capacity of the cloud reassembly device in a timely manner, or increase a quantity of cloud reassembly devices, to avoid a data packet loss caused by insufficient resources.

In an optional implementation, the method may further include:

the OLT control and management entity determines information about a peak time period based on historical resource usage information of the first OLT; and the OLT control and management entity sends the information about the peak time period to the first OLT.

In this implementation of this application, the OLT control and management entity may perform analysis based on the historical resource usage information of the first OLT, determine information about a peak time period of reassembly resource usage of the first OLT, and notify the first OLT. In this way, the first OLT can send the packet fragments to the cloud reassembly device in the peak time period for reassembly, to avoid a packet loss caused by insufficient reassembly resources of the first OLT.

A fourth aspect of this application provides an optical line terminal, including:

a receiving unit, configured to receive a plurality of packet fragments of a first packet that are sent by an optical network unit ONU;

a determining unit, configured to determine whether an upload condition is met; and a sending unit, configured to: after the determining unit determines that the upload condition is met, send the plurality of packet fragments to a cloud reassembly device, so that after receiving the plurality of packet fragments, the cloud reassembly device reassembles the plurality of packet fragments to obtain a second packet.

In an optional implementation, the optical line terminal may further include:

a reassembly unit, configured to: after the determining unit determines that the upload condition is not met, reassemble the plurality of packet fragments to obtain the second packet.

In an optional implementation, the determining unit is specifically configured to:

obtain information about the first packet; and
determine that the information about the first packet meets a first preset condition.

In an optional implementation, the information about the first packet includes one or more of the following: identification information of a transmission container TCONT corresponding to the first packet, packet type information of the first packet, length information of the plurality of packet fragments, or length information of the first packet; and the first preset condition includes one or more of the following:

an identifier corresponding to the transmission container TCONT corresponding to the first packet includes a cloud reassembly flag, a type of the first packet is not a management packet, a length of any fragmented packet in the plurality of packet fragments is greater than a first preset length, or a length of the first packet is greater than a second preset length.

In an optional implementation, the determining unit is specifically configured to:

determine that information about a first reassembly resource of the first OLT meets a second preset condition.

In an optional implementation, the information about the first reassembly resource includes reassembly resource usage of the first OLT or buffer resource information of the first OLT, and the second preset condition includes:

the reassembly resource usage of the first OLT is greater than a first threshold, or a buffer resource of the first OLT is less than a second threshold.

In an optional implementation, the determining unit is specifically configured to:

determine that a current time period is in a peak time period.

In an optional implementation, the peak time period is obtained based on one or more of the following: historical usage information of each TCONT of one or more TCONTs connected to the first OLT, a historical resource consumption status of the first OLT, or received information about the peak time period sent by an OLT control and management entity.

In an optional implementation, the determining unit is specifically configured to determine that indication information sent by the OLT control and management entity is received, where the indication information is used to indicate the first OLT to send the plurality of packet fragments to the cloud reassembly device.

In an optional implementation, the sending unit is further configured to: before the determining unit determines that the indication information sent by the OLT control and management entity is received, send the information about the first reassembly resource to the OLT control and management entity, where the first reassembly resource is used by the OLT control and management entity to obtain the indication information.

A fifth aspect of this application provides a cloud reassembly device, including:

a receiving unit, configured to receive a plurality of packet fragments of a first packet that are sent by a first OLT, where the plurality of packet fragments are sent to the cloud reassembly device after the first OLT determines that an upload condition is met; and a reassembly unit, configured to reassemble the plurality of packet fragments to obtain a second packet.

In an optional implementation, the cloud reassembly device further includes:

a sending unit, configured to send information about a second reassembly resource of the cloud reassembly device to an OLT control and management entity, where the information about the second reassembly resource is used by the OLT control and management entity to generate indication information, and the indication information is used to indicate the first OLT to send the plurality of packet fragments to the cloud reassembly device.

A sixth aspect of this application provides an OLT control and management entity, including:

an obtaining unit, configured to obtain information about a second reassembly resource of a cloud reassembly device;

a generation unit, configured to generate indication information based on the information about the second reassembly resource; and a sending unit, configured to send the indication information to a first OLT, where the indication information is used to indicate the first OLT to send a plurality of received packet fragments of a first packet to the cloud reassembly device, so that the cloud reassembly device reassembles the plurality of packet fragments to obtain a second packet.

In an optional implementation, the OLT control and management entity further includes a receiving unit.

The receiving unit is configured to receive information about a first reassembly resource sent by the first OLT, where the information about the first reassembly resource includes information about a resource usage status of the first OLT.

The generation unit is specifically configured to generate the indication information based on the information about the first reassembly resource and the information about the second reassembly resource.

In an optional implementation:

the generation unit is further configured to generate alarm prompt information by the OLT control and management entity when it is determined, based on the information about the second reassembly resource, that a used resource exceeds a third threshold, where the alarm prompt information is used to prompt that that the used resource of the cloud reassembly device exceeds the third threshold.

In an optional implementation, the OLT control and management entity further includes a determining unit.

The determining unit is configured to determine information about a peak time period based on historical resource usage information of the first OLT.

The sending unit is further configured to send the information about the peak time period to the first OLT.

A seventh aspect of this application provides an optical line terminal, including a processor, a memory, and an input/output interface. The processor and the memory are connected to the input/output interface. The memory is configured to store program code. When the processor invokes the program code in the memory, the steps of the method provided in any one of the first aspect or the implementations of the first aspect of this application are performed.

An eighth aspect of this application provides a cloud reassembly device, including a processor, a memory, and an input/output interface. The processor and the memory are connected to the input/output interface. The memory is configured to store program code. When the processor invokes the program code in the memory, the steps of the method provided in any one of the second aspect or the implementations of the second aspect of this application are performed.

A ninth aspect of this application provides an OLT control and management entity, including a processor, a memory, and an input/output interface. The processor and the memory are connected to the input/output interface. The memory is configured to store program code. When the processor invokes the program code in the memory, the steps of the method provided in any one of the third aspect or the implementations of the third aspect of this application are performed.

A tenth aspect of embodiments of this application provides a storage medium. It should be noted that technical solutions of this application essentially, or a part contributing to the conventional technology, or all or a part of the technical solutions may be implemented in a form of a software product. The computer software product is stored in the storage medium, which is configured to store computer software instructions used by the foregoing device. The computer software instructions include a program designed for the first OLT, the cloud reassembly device, or the OLT control and management entity in any implementation of any one of the first aspect to the third aspect.

The storage medium includes: any medium that can store program code, such as a USB flash drive, a removable hard disk, a read-only memory (ROM), a random access memory (RAM), a magnetic disk, or an optical disc.

An eleventh aspect of embodiments of this application provides a computer program product including instructions. When the computer program product is run on a computer, the computer is enabled to perform the method in any one of the implementations of the first aspect to the third aspect of this application.

A twelfth aspect of embodiments of this application provides a data reassembly apparatus. The data reassembly apparatus may be applied to a device such as a first OLT, a cloud reassembly device, or an OLT control and management entity. The data reassembly apparatus is coupled to a memory, and is configured to read and execute instructions stored in the memory, so that the data reassembly apparatus is enabled to implement the steps of the method provided in any implementation of any one of the first aspect to the third aspect of this application. In a possible design, the data reassembly apparatus is a chip or a system-on-a-chip.

A thirteenth aspect of this application provides a chip system. The chip system includes a processor, configured to support a first OLT, a cloud reassembly device, an OLT control and management entity, or the like to implement functions related to any implementation of any one of the first aspect to the third aspect of this application, for example, to process data and/or information related to the foregoing method. In a possible design, the chip system further includes a memory. The memory is configured to store program instructions and data that are necessary for the first OLT, the cloud reassembly device, or the OLT control and management entity. The chip system may include a chip, or may include a chip and another discrete device.

The processor mentioned anywhere above may be a general-purpose central processing unit (CPU), a microprocessor, an application-specific integrated circuit (ASIC), or one or more integrated circuits for controlling program execution of the data reassembly method in the first aspect to the third aspect.

A fourteenth aspect of embodiments of this application provides a data reassembly system. The data reassembly system includes a first OLT, a cloud reassembly device, and an OLT control and management entity. The first OLT may include the optical line terminal provided in the fourth aspect. The cloud reassembly device may include the cloud reassembly device provided in the fifth aspect. The OLT control and management entity may include the OLT control and management entity provided in the sixth aspect.

In this application, the first OLT may receive a plurality of packet fragments of a first packet, and when determining that an upload condition is met, the first OLT sends the plurality of packet fragments to the cloud reassembly device for reassembly. Therefore, the packet fragments may be reassembled in the cloud reassembly device to reduce an amount of data reassembled in a DDR memory, so as to reduce a delay caused by access of packet fragments to the DDR memory, and reduce power consumption of the first OLT.

DESCRIPTION OF EMBODIMENTS

This application provides a data reassembly method and an apparatus, to reassemble packet fragments in combination with local reassembly and cloud reassembly, so as to obtain a reassembled packet. This improves reassembly efficiency, reduces a packet reassembly delay, and reduces power consumption of a first OLT.

The data reassembly method provided in this application may be applied to a PON system. For example, an architecture of the PON system may be shown in FIG. 1A.

The PON system may include devices such as an OLT, an ODN, and at least one ONU.

The ODN may include at least one optical splitter (splitter). The optical splitter is configured to split an optical signal, so that an optical signal may be transmitted to each ONU connected to the optical splitter.

The ONU is configured to: receive data sent by a first OLT, buffer ethernet data of a user in respond to a management command of the first OLT, and send data in an uplink direction in a transmit window allocated by the first OLT, and so on. The ONU may specifically include a bidirectional optical subassembly (BOSA), and the BOSA may further specifically include a transmitter optical subassembly (TOSA), a receiver optical subassembly (ROSA), and the like. The TOSA may be configured to send an optical signal, and the ROSA may be configured to receive an optical signal.

Figure 1A:
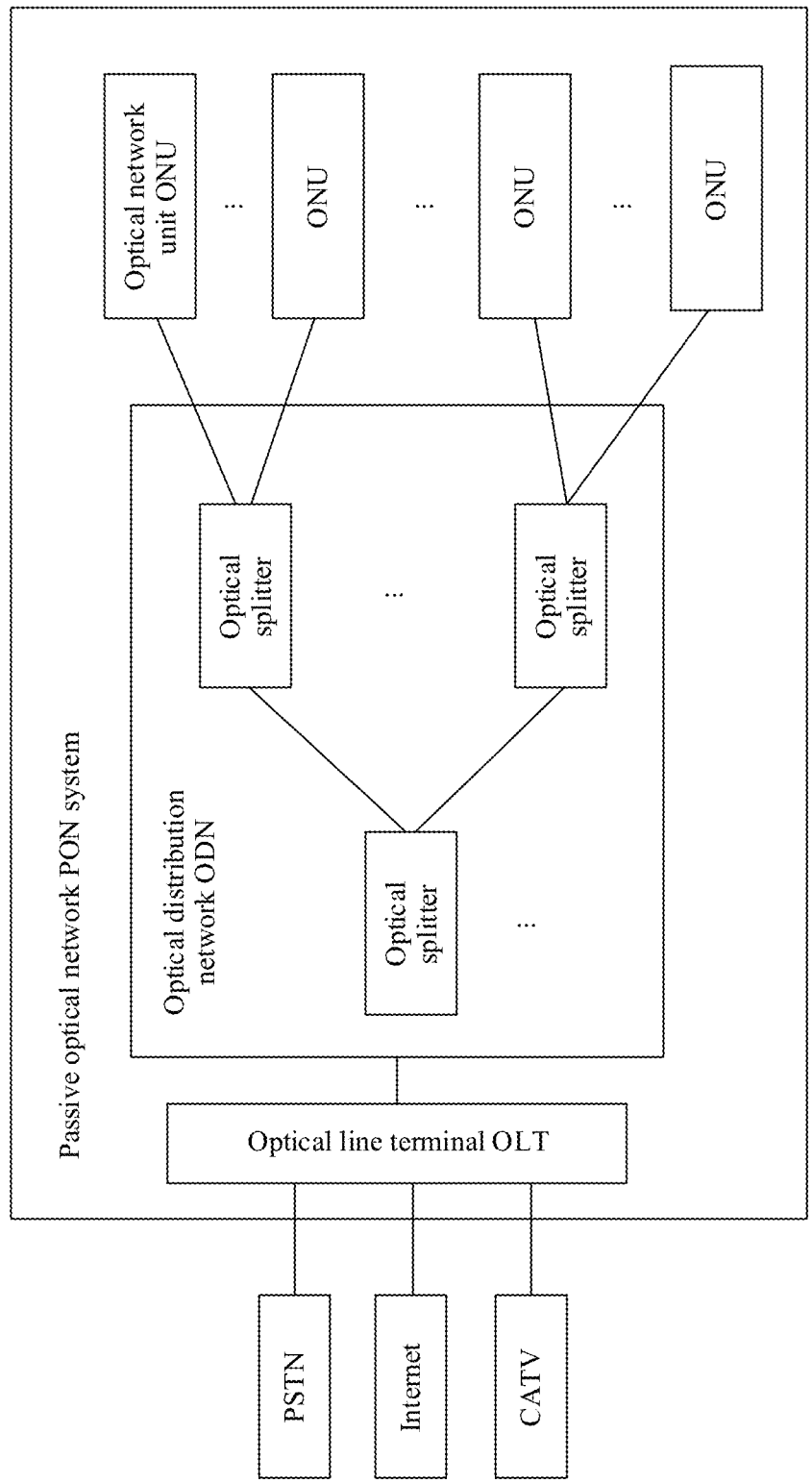
FIG. 1A is a schematic diagram of a structure of a PON system to which an embodiment of this application is applied.

It should be understood that the at least one ONU in FIG. 1A in this application may alternatively be replaced with at least one optical network terminal (ONT) or another similar device, or at least one device connected to the ODN may include both the ONU and the ONT.

An OLT is a core component of an optical access network. The OLT is configured to provide data to one or more connected ONUs, receive data sent by the one or more ONUs, reassemble packets, and provide management, and so on. The OLT may be configured to send an optical signal to the at least one ONU, receive information fed back by the ONU, and process the information or other data that is fed back by the ONU.

Figure 1B:
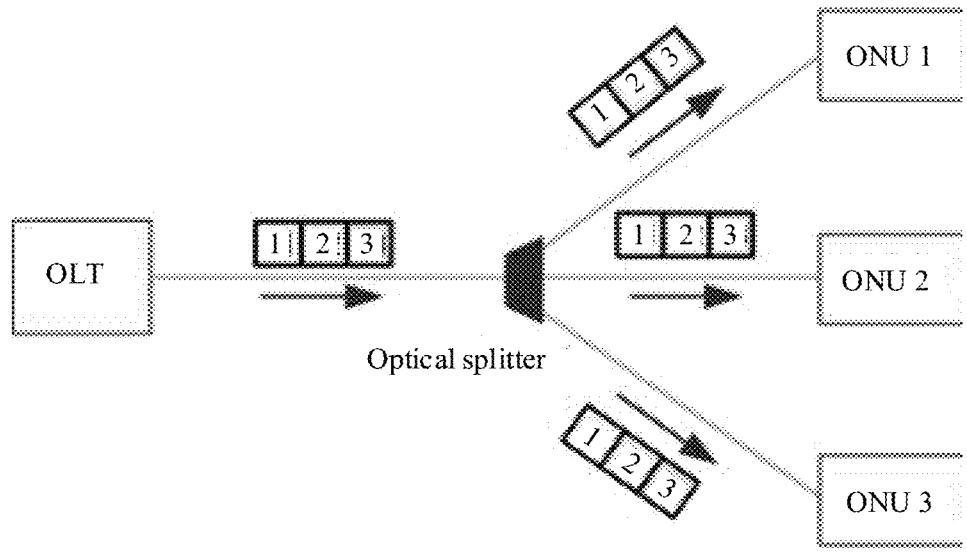
FIG. 1B is a schematic diagram of data transmission in a PON system to which an embodiment of this application is applied.
Figure 1C:
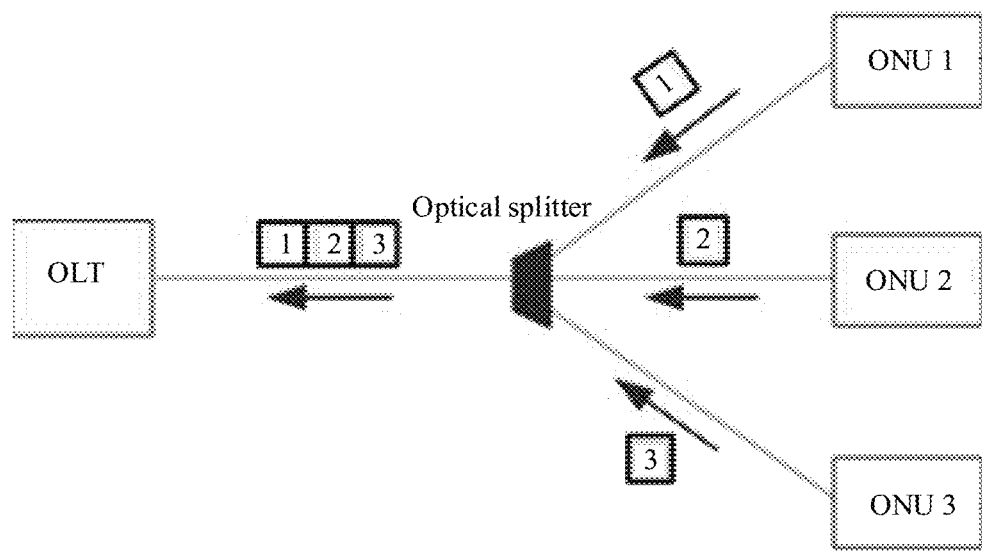
FIG. 1C is a schematic diagram of data transmission in a PON system to which an embodiment of this application is applied.

In the PON system, an uplink optical signal and a downlink optical signal may be transmitted in a same optical fiber in a time division multiplexing (TDM) manner. For example, as shown in FIG. 1B, the first OLT can allocate slots to an ONU 1, an ONU 2, and an ONU 3 and notify each ONU that, for example, a slot 1 is allocated to the ONU 1, a slot 2 is allocated to the ONU 2, and a slot 3 is allocated to the ONU 3. As shown in FIG. 1C, the ONU 1 can transmit data in the slot 1, the ONU 2 can transmit data in the slot 2, and the ONU 3 can transmit data in the slot 3, so as to avoid a data conflict among the ONUs.

A same ODN or optical splitter may be connected to a plurality of different ONUs, and the ONUs perform data transmission in different slots. Data transmitted by the ONU may require more time domain resources, which may be greater than a slot available to the ONU. Therefore, the ONU may fragments a packet needing to be transmitted, to split one packet into a plurality of packet fragments. For example, the ONU 1 may split a first packet into a plurality of packet fragments, and transmit them to the OLT in different slots. It can be understood that an uplink data flow in the PON system uses a TDMA technology. To be specific, an uplink time is divided into many time slices, and the first OLT allocates an uplink slot to each ONU based on comprehensive information such as a bandwidth status and a service priority reported by the ONU. Therefore, each ONU connected to the OLT can send its respective data in a particular order, to avoid a conflict.

Therefore, after receiving a plurality of packet fragments obtained by dividing a same packet, the OLT further needs to reassemble the plurality of packet fragments, to obtain a complete reassembled packet.

In a specific application scenario, during transmission of a fragmented packet, transmission may be performed by using a GPON encapsulation method (GEM) frame as a unit, which may be understood as a basic data structure for data transmission. Generally, data in the GPON system is all encapsulated in a GEM frame for transmission, and each GEM frame may be identified by a GEM port. During encapsulation of a GEM frame, a data part is mapped to a GEM payload and the information is encapsulated, to obtain the GEM frame. In different network architectures, unit frames may be different. For example, a GEM in a 10G GPON is referred to as an XGEM. Herein, a GEM in the GPON system is used as an example for description.

A transmission container (TCONT) is a bearer for carrying data in uplink transmission. Usually, the ONU applies for a frequency resource from the OLT, and the OLT grants available bandwidth, which is the TCONT, to the ONU. The TCONT may be understood as a particular range of frequency bandwidth, and one TCONT may carry one or more GEM frames. The TCONT may be understood as a basic unit for granting bandwidth. Each TCONT may be uniquely identified by an allocation identifier (Alloc-ID). The Alloc-ID of each TCONT may be allocated by the first OLT. Alloc-IDs of TCONTs corresponding to ONUs with a same port are different. To be specific, Alloc-IDs of TCONTs corresponding to ONUs connected to a same port are different, and a same ONU may correspond to one or more TCONTs. The TCONT is a basis of dynamic bandwidth assignment (DBA). The ONU applies for TCONT bandwidth, and the OLT performs a TCONT grant, to improve DBA of uplink data in the entire GPON system.

Because a length of a user data frame is random, a user data frame with a relatively large length cannot be normally transmitted, and packet fragmentsation needs to be performed. In addition, a GEM frame header is inserted before a payload of each fragments to obtain a fragmented packet. After the OLT receives a data packet, if the data packet is a fragmented packet, the OLT may buffer the fragmented packet. After receiving all packet fragments of a same packet, the OLT reassembles the packet fragments to obtain a complete packet, and converts it to an ethernet frame for subsequent processing. For a packet with a relatively small length, the packet is directly added with a frame header and then sent to the OLT without fragmentsation.

In an existing solution, an OLT may reassemble packet fragments in combination with a local CRB and a DDR memory. However, during DDR reassembly, access of data to the DDR memory requires a relatively large delay and relatively high power consumption, resulting in a large delay of packet reassembly and high power consumption of the OLT. In addition, the increase in an upstream rate of a PON system (for example, the rate may reach 10 Gbps, 25 Gbps, or 50 Gbps, or higher) is accompanied with increasing to-be-reassembled packet fragments, and reassembly resources of the OLT are gradually unable to adapt to a transmission rate of the to-be-reassembled packet fragments. It should be noted that, in the following implementations of this application, fragmented packet reassembly in the CRB may be referred to as CRB reassembly, and reassembly in the DDR memory may be referred to as DDR reassembly. Details are not described below again.

Figure 2:
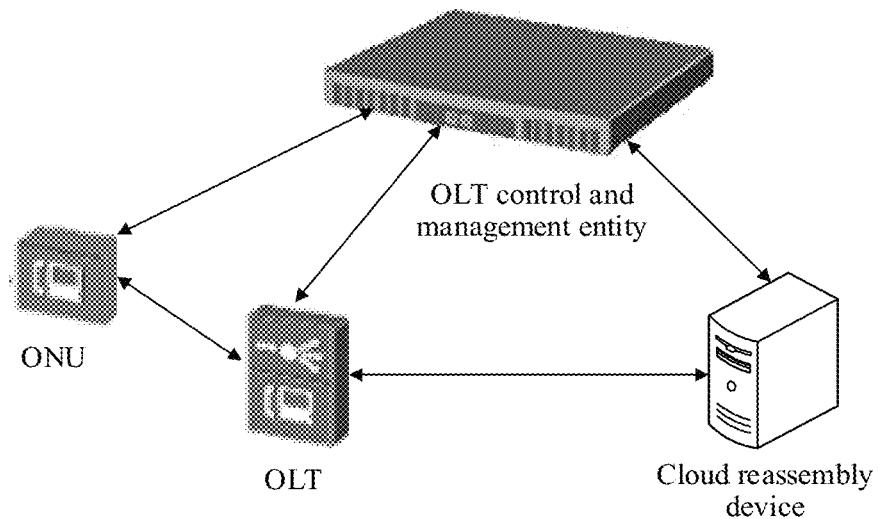
FIG. 2 is a schematic diagram of a network architecture to which a data reassembly method provided in an embodiment of this application is applied.

Therefore, this application provides a data reassembly method, to reassembly packet fragments by using local reassembly in an OLT in combination with a cloud reassembly device. Specifically, packet fragments may be reassembled mainly by using a local CRB in combination with the cloud reassembly device. This can reduce a data amount of DDR reassembly of the OLT, and reduce a delay of access of data to a DDR memory, even with no reassembly in the local DDR memory of the OLT, thereby reducing power consumption of the OLT, and improving processing capacity of to-be-reassembled packet fragments. Based on this, in an example, a network architecture to which the data reassembly method provided in this application is applied may be shown in FIG. 2. The network architecture may include at least one ONU, an OLT, a cloud reassembly device, and an OLT control and management entity.

For the ONU and the OLT, refer to related descriptions in FIG. 1A.

The cloud reassembly device may be configured to reassemble packet fragments sent by the OLT to obtain a complete packet. Usually, the cloud reassembly device may be flexibly disposed. Specifically, there may be one or more cloud reassembly devices, and a type of the cloud reassembly device may be a server or a dedicated reassembly device, or a reassembly function may be integrated into an existing device, so as to replace a part of the existing device. For example, the cloud reassembly device may replace an aggregation switch, or replace a leaf switch in a spine-leaf network structure, or be disposed in the leaf switch, or be disposed in a broadband network gateway (BNG), or the like.

The OLT control and management entity may be configured to monitor a resource usage status of the cloud reassembly device, and manage one or more OLTs. The OLT control and management entity may be deployed on a server, or may be deployed on an OLT, or may be integrated into some network elements of a public cloud or private cloud network in an existing solution. For example, the OLT control and management entity may be integrated into a software-defined networking (SDN) controller, another network element, or the like.

It should be noted that, in the foregoing scenario, the OLT and the OLT control and management entity are separate structures. Generally, the OLT may be referred to as a pOLT (physical OLT, physical OLT), and the OLT control and management entity may be referred to as a virtual OLT (virtual OLT, vOLT). The vOLT may be carried by using a server, a network device in a public cloud or a private cloud, or another network device, and is configured to manage the pOLT. For ease of differentiation, the pOLT is referred to as a first OLT in the following, and details are not described herein again.

In addition, the vOLT may also be understood as a software-defined networking (SDN) controller or a part of a function of the SDN controller. For example, the SDN controller may collect resource information of the cloud reassembly device, such as a media access control (MAC) address, an internet protocol (IP) address, or reassembly resource usage of the cloud reassembly device, to monitor a resource usage status of the cloud reassembly device. In addition, the SDN controller may further send the MAC/IP address or the like of the cloud reassembly device to the first OLT, so that the first OLT may send, to the cloud reassembly device by using the MAC/IP address, packet fragments needing to be reassembled in the cloud reassembly device.

Figure 3:
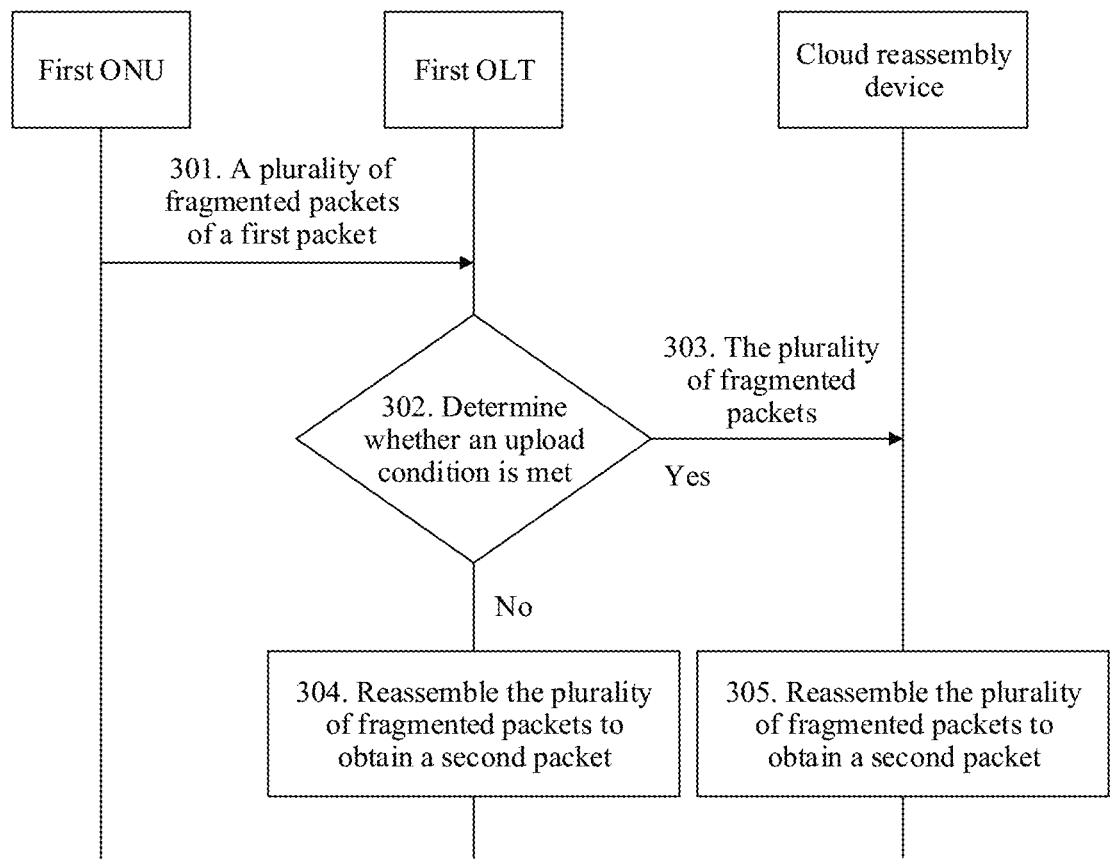
FIG. 3 is a schematic flowchart of a data reassembly method according to an embodiment of this application.

The following describes, based on the foregoing PON system and network architecture, the data reassembly method provided in this application. Refer to FIG. 3, which is a schematic flowchart of a data reassembly method provided in this application. The method is described as follows is described as follows.

301. An ONU sends a plurality of packet fragments to a first OLT.

The ONU is any ONU in at least one ONU connected to the PON system. When needing to send data to the first OLT, where a first packet is used as an example, the ONU may fragments the first packet into a plurality of packet fragments.

The ONU may sequentially send, by using the ODN, the plurality of packet fragments to the first OLT in a corresponding time domain resource, for example, in a slot allocated by the first OLT to the ONU.

Before step 301, the first ONU may split the first packet into the plurality of packet fragments, and send the plurality of packet fragments to the first OLT. For example, if a length of the first packet is greater than a sending length of a slot available to the ONU, and therefore the first packet cannot be sent to the first OLT in one slot, the ONU may fragments the first packet into the plurality of packet fragments. In this way, a length of each fragmented packet is less than the sending length of the slot available to the ONU, and the plurality of packet fragments are sequentially sent to the first OLT in a GEM frame encapsulation format.

302. The first OLT determines whether an upload condition is met, and if the upload condition is met, performs step 303, or if the upload condition is not met, performs step 304.

After receiving the plurality of packet fragments sent by the ONU, the first OLT may determine whether the upload condition is met. If the upload condition is met, the first OLT sends the plurality of packet fragments of the first packet to a cloud reassembly device for reassembly, that is, performs step 303. If the upload condition is not met, the first OLT locally reassembles the plurality of packet fragments, that is, performs step 304.

Specifically, the first OLT may obtain reassembly information for reassembling the plurality of packet fragments, so that the first OLT may determine, based on the reassembly information, whether the upload condition is met. The reassembly information may include condition information, resource information, indication information, or the like for reassembly of the plurality of packet fragments. Specifically, the reassembly information may include information about the plurality of packet fragments, resource usage information of the first OLT, a current time period or indication information, or the like. The information about the plurality of packet fragments may include information such as lengths of the plurality of packet fragments and whether the fragmented packet is a header or a tail packet. The resource usage information of the first OLT may include current reassembly resource usage, available resource information, or the like of the first OLT. The current time period is a time period in which the plurality of packet fragments are received. The indication information is an indication, indicating to locally reassemble the plurality of packet fragments at the first OLT or perform reassembly at the cloud reassembly device, or the like.

In a possible implementation, the upload condition may include but is not limited to one or more of the following: information about the first packet meets a first preset condition; information about a first reassembly resource of the first OLT meets a second preset condition, where the information about the first reassembly resource includes information about a resource usage status of the first OLT; the current time period is in a peak time period; or the first OLT receives indication information sent by an OLT control and management entity, where the indication information is used to indicate the first OLT to send to-be-reassembled packet fragments to the cloud reassembly device, or the like. Correspondingly, that the first OLT determines that the upload condition is met may specifically include but is not limited to one or more of the following: the first OLT obtains the information about the first packet and determines that the information about the first packet meets the first preset condition; the first OLT determines that the information about the first reassembly resource of the first OLT meets the second preset condition; the first OLT determines that the current time period is in the peak time period; or the first OLT determines that the indication information sent by the OLT control and management entity is received, where the indication information is used to indicate the first OLT to send the plurality of packet fragments to the cloud reassembly device, or the like.

It should be understood that the upload condition may include a plurality of combinations including one or more of the foregoing conditions, and a specific combination of the upload conditions may be adjusted based on an actual application scenario. For example, the upload condition may include: the information about the plurality of packet fragments meets the first preset condition, and the information about the first reassembly resource of the first OLT meets the second preset condition; or the current time period is in the peak time period; the information about the plurality of packet fragments meets the first preset condition, and the current time period is in the peak time period; or another combination. This can be specifically adjusted based on an actual application scenario, and is not limited in this application.

In a specific implementation, the information about the first packet includes one or more of the following: identification information of a transmission container TCONT corresponding to the first packet, packet type information of the first packet, length information of the plurality of packet fragments of the first packet, or length information of the first packet. The TCONT corresponding to the first packet may be a TCONT for transmitting the plurality of packet fragments of the first packet, and the plurality of packet fragments may be transmitted in a same TCONT. A packet type of the first packet may include a management packet or a non-management packet.

Correspondingly, the first preset condition includes but is not limited to one or more of the following: an identifier corresponding to the TCONT corresponding to the first packet includes a cloud reassembly flag, the first packet is not a management fragmented packet, a length of any fragmented packet in the plurality of packet fragments is greater than a first preset length, or a length of the first packet is greater than a second preset length, or the like.

In a specific implementation, the second preset condition includes but is not limited to: reassembly resource usage of the first OLT is greater than a first threshold, or a buffer resource of the first OLT is less than a second threshold. In addition, the second preset condition may further include a condition related to load of the first OLT, for example: central processing unit (CPU) usage or memory usage of the first OLT is greater than a load threshold. This can be specifically adjusted based on an actual application scenario.

In a specific implementation, the peak time period is obtained based on one or more of the following: historical usage information of each TCONT of one or more TCONTs connected to the first OLT, a historical resource consumption status of the first OLT, or received information about the peak time period sent by the OLT control and management entity, or the like.

In an optional implementation, the first OLT further sends historical resource usage information of the first OLT to the OLT control and management entity, and receives the information about the peak time period sent by the OLT control and management entity. Therefore, the first OLT may send the historical resource usage information to the OLT control and management entity, and the OLT control and management entity analyzes the historical resource usage information to determine a peak time period in which the first OLT has a large data reassembly amount, so as to notify the first OLT. In this way, the OLT may send the packet fragments to the cloud reassembly device in the peak time period for reassembly, to improve efficiency in reassembling the plurality of packet fragments, and reduce reassembly workload of the first OLT, thereby improving efficiency in reassembling the fragmented packet by the first OLT, and reducing power consumption of the first OLT.

In an optional implementation, the first OLT further sends the information about the first reassembly resource to the OLT control and management entity, so that the OLT control and management entity may obtain a reassembly resource usage status of the first OLT.

In a possible implementation, after the first OLT sends the information about the first reassembly resource to the OLT control and management entity, the first OLT may further receive indication information sent by the OLT control and management entity, where the indication information is used to indicate the first OLT to send the plurality of packet fragments to the cloud reassembly device. In this way, the cloud reassembly device reassembles the plurality of packet fragments, to reduce workload of the first OLT, and reduce power consumption of the first OLT. For example, when determining that the reassembly resource usage of the first OLT is relatively high and the reassembly resource usage of the cloud reassembly device is relatively low, the OLT control and management entity may send the indication information to the first OLT, so that the first OLT sends the packet fragments to the cloud reassembly device for reassembly. This reduces a data reassembly amount of the first OLT, improves data reassembly efficiency of the first OLT, and balances load between the first OLT and the cloud reassembly device.

Further, there are a plurality of manners in which the first OLT determines whether the upload condition is met. The manner may specifically include: the ONU may sequentially send the plurality of packet fragments to the first OLT, and after receiving each fragmented packet in the plurality of packet fragments, the first OLT determines whether the upload condition is met, or after receiving all packet fragments in the plurality of packet fragments of the first packet, the first OLT determines whether the upload condition is met.

In a scenario, after receiving each fragmented packet in the plurality of packet fragments, the first OLT may determine whether the upload condition is met, and if the upload condition is met, send the plurality of packet fragments to the cloud reassembly device. That the first OLT sequentially receives a first fragmented packet and a second fragmented packet in the plurality of packet fragments is used as an example. After receiving the first fragmented packet, the first OLT determines whether the upload condition is met. If the upload condition is met, the first OLT sends the first fragmented packet to the cloud reassembly device, or sends the first fragmented packet to the cloud reassembly device after receiving all fragments in the plurality of packet fragments. If the upload condition is not met, the first OLT stores the first fragmented packet. If the first OLT determines that the upload condition is met after receiving the first fragmented packet, the first OLT may directly send the second fragmented packet to the cloud reassembly device after receiving the second fragmented packet, or send the plurality of packet fragments to the cloud reassembly device after receiving all packet fragments in the plurality of packet fragments. If the first OLT determines that the upload condition is not met after the first fragmented packet is received, the first OLT may continue to determine whether the upload condition is met after receiving the second fragmented packet. When the upload condition is met, the first OLT may directly send the first fragmented packet and the second fragmented packet to the cloud reassembly device, or send the first fragmented packet and the second fragmented packet to the cloud reassembly device after receiving all fragments in the plurality of packet fragments, and so on.

In another scenario, after receiving the plurality of packet fragments of the first packet, the first OLT may determine whether the upload condition is met, and if the upload condition is met, send the plurality of packet fragments to the cloud reassembly device. Alternatively, if the upload condition is not met, the first OLT locally reassembles the plurality of packet fragments. In addition, when the upload condition is related to the fragmented packet, if any fragmented packet in the plurality of packet fragments of the first packet meets the upload condition, the first OLT sends all the plurality of packet fragments to the cloud reassembly device.

303. If the upload condition is met, the first OLT sends the plurality of packet fragments to the cloud reassembly device.

If the first OLT determines that the upload condition is met, the first OLT sends the plurality of packet fragments to the cloud reassembly device, so that the cloud reassembly device reassembles the plurality of packet fragments to obtain a corresponding first packet.

In a possible implementation, when sending the plurality of packet fragments, the first OLT may add preset headers to the plurality of packet fragments, and send the plurality of packet fragments added with the preset headers to the cloud reassembly device. The preset header may include the information about the plurality of packet fragments, for example, information such as lengths and start bytes of the plurality of packet fragments, and whether the fragmented packet is a head packet. The preset header may further include other information, such as address information of the cloud reassembly device or address information of the first OLT.

In a possible implementation, the first OLT further receives information about a second reassembly resource of the cloud reassembly device sent by the OLT control and management entity, so that the first OLT can learn a reassembly resource usage status of the cloud reassembly device in a timely manner, and more accurately determine whether the plurality of packet fragments need to be sent to the cloud reassembly device for reassembly. For example, the OLT control and management entity may determine, with reference to the information about the first reassembly resource and the information about the second reassembly resource, whether to generate the indication information.

304. If the upload condition is not met, the first OLT locally reassembles the plurality of packet fragments to obtain a second packet.

After the first OLT determines that the upload condition is not met, the first OLT may locally reassemble the plurality of packet fragments to obtain a complete second packet.

The second packet and the first packet may be the same or different. For example, transmission data included in the first packet is the same as transmission data included in the second packet, and formats, headers, and the like of the first packet and the second packet may be the same, or may be different.

Optionally, the first OLT may reassemble the plurality of packet fragments at a local CRB. For example, the first OLT may be provided with a large-capacity CRB, to perform fragmented packet reassembly, thereby avoiding fragmented packet reassembly in a DDR memory, and improving efficiency in reassembling packet fragments.

Optionally, the first OLT may reassemble the plurality of packet fragments in the CRB, and may also reassemble the plurality of packet fragments in the DDR memory. For example, when CRB usage of the first OLT is relatively high, some to-be-reassembled packet fragments may be reassembled in the DDR memory.

Usually, to reduce power consumption of the first OLT and improve efficiency in locally reassembling packet fragments, the first OLT may reassemble the packet fragments only in the local CRB, access of the packet fragments to the DDR memory is not required, thereby reducing a delay of access of the packet fragments to the DDR memory, improving efficiency in reassembling packet fragments, and reducing power consumption of the first OLT.

305. The cloud reassembly device reassembles the plurality of packet fragments to obtain a second packet.

After receiving the plurality of packet fragments of the first packet, the cloud reassembly device reassembles the plurality of packet fragments to obtain a complete second packet.

The first OLT may sequentially send the plurality of packet fragments to the cloud reassembly device. When the cloud reassembly device receives the plurality of packet fragments and the plurality of packet fragments are not completely received, the cloud reassembly device may store a received fragmented packet, and after all the plurality of packet fragments of the first packet are received, reassembly the plurality of packet fragments to obtain a complete second packet.

The cloud reassembly device may include one or more cloud servers, and is configured to perform data reassembly. In addition, when performing data reassembly, the cloud reassembly device may perform reassembly at a CRB, or may perform DDR reassembly. This is not limited in this application.

Moreover, after the cloud reassembly device reassembles the plurality of packet fragments to obtain the second packet, the cloud reassembly device may send the second packet to a next-hop device without a need of sending the second packet back to the first OLT. For example, if an ONU needs to send a first packet to an application server, the ONU first fragments the first packet into a plurality of packet fragments, and then sends them to the first OLT. The first OLT or the cloud reassembly device performs reassembly, and after the reassembly is completed to obtain a second packet, may read an address of the application server included in the second packet. Then, the second packet is sent to the application server (the second packet may be forwarded by using one or more forwarding devices), without a need of sending the second packet back to the first OLT.

A specific manner in which the first OLT or the cloud reassembly device reassembles packet fragments in step 304 and step 305 may include: removing frame header parts from the plurality of packet fragments after receiving the plurality of packet fragments sent by the first OLT. Alternatively, data parts included in the plurality of packet fragments are directly obtained, and the data parts are spliced or combined, or the like, to obtain a complete second packet. For example, an ethernet frame is used as an example. The ONU may fragments the ethernet frame into N packet fragments, convert each fragmented packet into a GEM frame, and send the GEM frame to the first OLT. The first OLT may perform reassembly, conversion, and the like on the N packet fragments, or send the N packet fragments to the cloud reassembly device for reassembly, conversion, and the like, to obtain a complete ethernet frame, for subsequent processing.

In an optional implementation, the cloud reassembly device further sends the information about the second reassembly resource of the cloud reassembly device to the OLT control and management entity, so that the OLT control and management entity may generate the indication information based on the information about the second reassembly resource of the cloud reassembly device, to indicate the first OLT to send the plurality of to-be-reassembled packet fragments to the cloud reassembly device for reassembly.

In this implementation of this application, the first OLT may receive the plurality of packet fragments of the first packet, and when determining that the upload condition is met, the first OLT sends the plurality of packet fragments to the cloud reassembly device for reassembly, to reduce an amount of data reassembly performed in the DDR memory of the first OLT, even with no reassembly in the local DDR memory of the first OLT, thereby reducing a delay caused by access of fragmented packet to the DDR memory, reducing power consumption of the first OLT, and improving efficiency in locally reassembling packet fragments.

The foregoing describes the procedure of the data reassembly method provided in this application. The following describes the procedure of the data reassembly method provided in this application in more detail.

The first OLT may determine whether the upload condition is met in a plurality of manners. The following uses the first fragmented packet as an example to describe the data reassembly method provided in this application. The first fragmented packet may be any fragmented packet in the plurality of packet fragments of the first packet. In addition, the upload condition may include a plurality of different types of conditions. The following describes a plurality of different upload conditions in different scenarios with examples.

Scenario 1

Figure 4A:
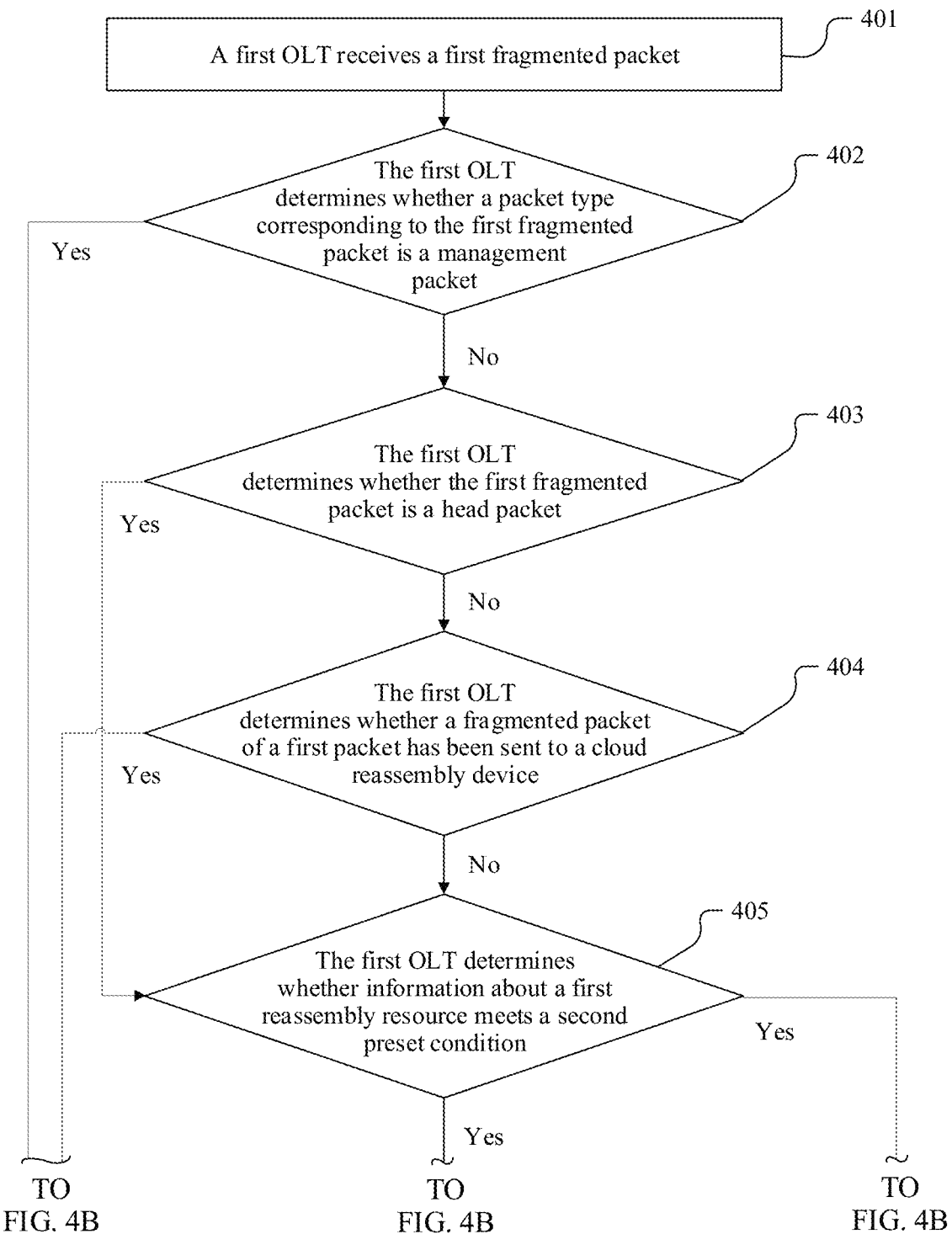
FIG. 4A and FIG. 4B is another schematic flowchart of a data reassembly method according to an embodiment of this application.
Figure 4B:
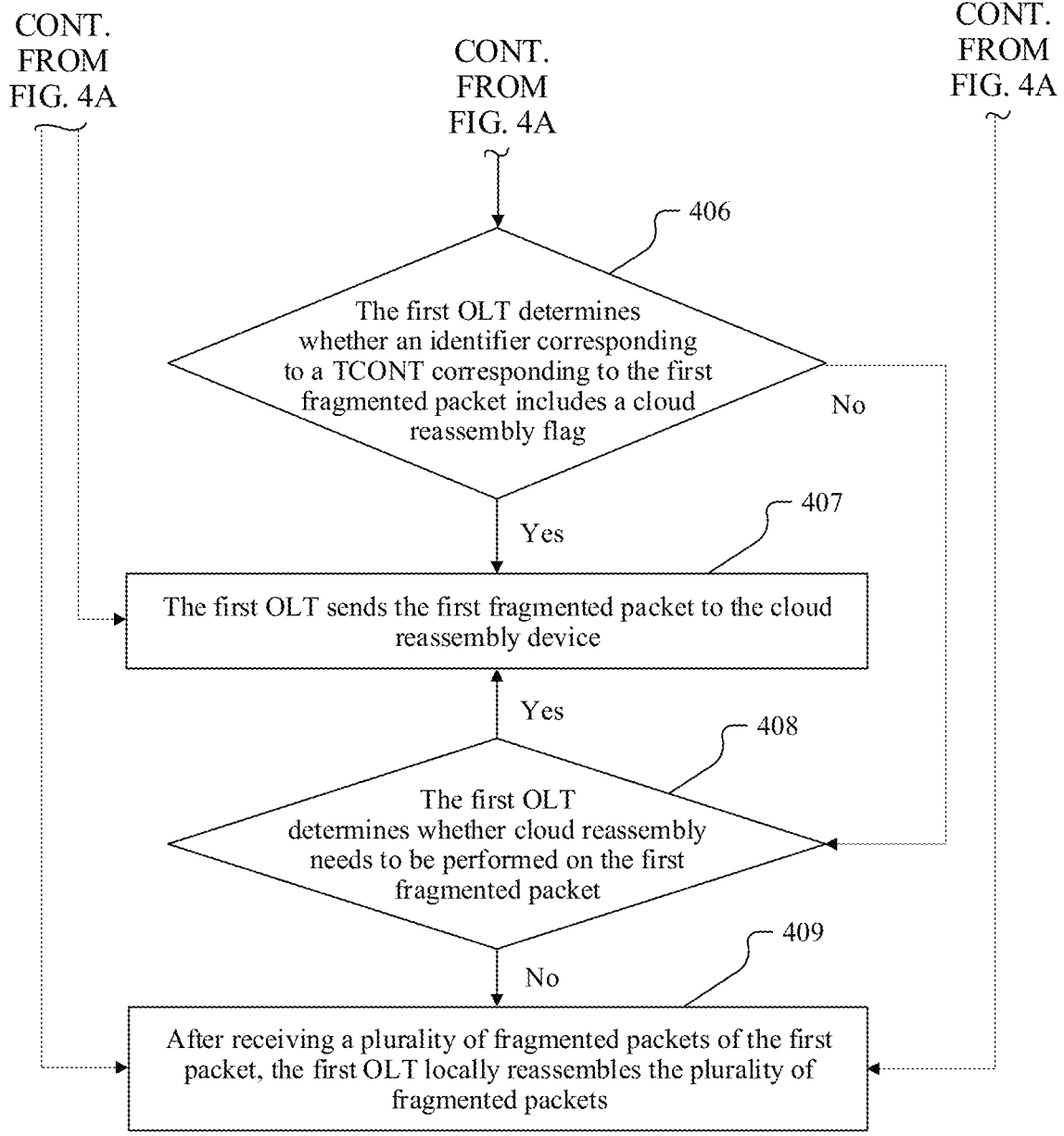

Refer to FIG. 4A and FIG. 4B, which is a schematic flowchart of another data reassembly method provided in this application. The method is described as follows.

401. A first OLT receives a first fragmented packet.

For step 401 in this application, refer to related descriptions in step 301. Details are not described herein again.

402. The first OLT determines whether a packet type corresponding to the first fragmented packet is a management packet, and if the packet type is a management packet, performs step 409, or if the packet type is not a management packet, performs step 403.

After the first OLT receives the first fragmented packet, the first OLT may first determine whether the packet type corresponding to the first fragmented packet is a management packet. If the packet type corresponding to the first fragmented packet is a management packet, the first OLT performs step 409, that is, the first fragmented packet is processed locally in the first OLT. If the packet type corresponding to the first fragmented packet is not a management packet, the first OLT may continue to determine whether the first fragmented packet is a head packet of a received first packet, that is, performs step 403.

It should be understood that the packet type corresponding to the first fragmented packet is a packet type corresponding to the first packet. For example, if the packet type of the first packet is a management packet, the packet type corresponding to the first fragmented packet is also a management packet.

Usually, the management packet is a packet for managing the first OLT or an ONU. For example, after restoring a configuration of the ONU, the ONU may send a configuration restoration packet to the first OLT, so as to notify the first OLT of restored configuration information of the ONU. Therefore, the management packet does not need to be sent to a cloud reassembly device, and the first OLT may reassemble management packets, to read information in the management packets, so as to obtain configuration information of the ONU.

In addition, the management packet may usually be transmitted in a preset TCONT. For example, the management packet may be transmitted in a TCONT 0. Therefore, when the first OLT receives the first fragmented packet transmitted by using the TCONT 0, it may be determined that the type corresponding to the first fragmented packet is a management packet. Usually, one port in a PON system may support 2000 TCONTs, and an ONU connected to each port may support a plurality of (for example, four or eight) TCONTs. The to-be-reassembled fragmented packet may be classified into a plurality of types, such as an ethernet type or an optical network unit management and control interface (ONU Management and Control Interface, OMCI) type. An OMCI packet is a management packet, and the TCONT 0 is used by default. A packet of another type may be carried in another TCONT different from the TCONT 0. Therefore, when the first OLT detects that the first fragmented packet is a packet transmitted in the TCONT 0, the first OLT may determine that the first fragmented packet is a management packet, and locally reassemble the first fragmented packet.

403. The first OLT determines whether the first fragmented packet is a head packet, and if the first fragmented packet is the head packet, performs step 405; or if the first fragmented packet is not the head packet, performs step 404.

If the first OLT determines that the first fragmented packet is the head packet, the first OLT may perform step 404, or if the first fragmented packet is not the head packet, the first OLT may continue to perform step 403.

The head packet may be understood as a first fragmented packet obtained after the complete first packet is fragmented in sequence, or is the first fragmented packet, received by the first OLT, of the first packet.

404. The first OLT determines whether a fragmented packet of the first packet has been sent to the cloud reassembly device, and if the fragmented packet has been sent to the cloud reassembly device, performs step 407, or if no fragmented packet of the first packet has been sent to the cloud reassembly device, performs step 405.

After the first OLT determines that the packet type corresponding to the first fragmented packet is not the head packet, the first OLT may continue to determine whether any one of a plurality of packet fragments corresponding to the first packet has been sent to the cloud reassembly device, and if any one of the plurality of packet fragments has been sent to the cloud reassembly device, the first OLT sends the first fragmented packet to the cloud reassembly device for reassembly, that is, performs step 407. If no fragmented packet, received by the first OLT, of the first packet has been sent to the cloud reassembly device, the first OLT may continue to determine whether the first fragmented packet needs to be reassembled in the cloud reassembly device, that is, performs step 405.

405. The first OLT determines whether information about a first reassembly resource meets a second preset condition, and if the information about the first reassembly resource meets the second preset condition, performs step 406, or if the information about the first reassembly resource does not meet the second preset condition, performs step 409.

The information about the first reassembly resource may include reassembly resource usage of the first OLT, an available buffer resource of the first OLT, and the like.

The second preset condition may include: the reassembly resource usage of the first OLT is greater than a first threshold, or the available buffer resource of the first OLT is less than a second threshold, or the like.

If the information about the first reassembly resource meets the second preset condition, step 406 is performed, or if the information about the first reassembly resource does not meet the second preset condition, step 409 is performed.

It can be understood that the first OLT may continue to determine whether the first fragmented packet needs to be sent to the cloud reassembly device for reassembly, that is, perform step 406, if the information about the first reassembly resource meets the second preset condition, which may be: the resource usage of the first OLT is greater than the first threshold, or the available buffer resource of the first OLT is less than the second threshold, or the like, that is, a resource that can be used to reassemble the first fragmented packet is insufficient in the first OLT. Certainly, the first fragmented packet may alternatively be directly sent to the cloud reassembly device for reassembly. However, the first OLT may determine that the plurality of packet fragments of the first packet may be reassembled locally in the first OLT, that is, perform step 409, if the information about the first reassembly resource does not meet the second preset condition, which may: the resource usage of the first OLT is not greater than the first threshold, or the available buffer resource of the first OLT is not less than the second threshold, that is, a resource that can be used to reassemble packet fragments is robust in the first OLT.

In a possible implementation, if one or more packet fragments of the first packet have been buffered in the first OLT, and after receiving the first fragmented packet, if the information about the first reassembly resource of the first OLT meets the second preset condition, the first OLT sends both the received first fragmented packet and the one or more buffered packet fragments of the first packet to the cloud reassembly device, so that the cloud reassembly device reassembles the plurality of packet fragments of the first packet to obtain a complete second packet.

In addition, when the information about the first reassembly resource of the first OLT meets the second preset condition, in addition to sending the first fragmented packet and the one or more buffered packet fragments to the cloud reassembly device, the first OLT may further send another to-be-reassembled fragmented packet that is buffered in the first OLT and that is not reassembled to the cloud reassembly device, so as to release a local reassembly resource of the first OLT, so that the first OLT may reassemble packet fragments of higher importance.

After the reassembly resource of the first OLT is robust, the first OLT may continue to preferentially reassemble packet fragments in a local CRB.

406. The first OLT determines whether an identifier corresponding to a TCONT corresponding to the first fragmented packet includes a cloud reassembly flag, and if the identifier corresponding to the TCONT includes the cloud reassembly flag, performs step 407, or if the identifier corresponding to the TCONT does not include the cloud reassembly flag, performs step 408.

The first fragmented packet may be transmitted in the corresponding TCONT, and the first OLT may determine whether the identifier corresponding to the TCONT corresponding to the first fragmented packet includes the cloud reassembly flag. The cloud reassembly flag is a flag indicating that cloud reassembly needs to be performed on a fragmented packet transmitted in the TCONT. If the identifier corresponding to the TCONT corresponding to the first fragmented packet includes the cloud reassembly flag, the first OLT sends the first fragmented packet to the cloud reassembly device, that is, performs step 407, so that the cloud reassembly device reassembles the first fragmented packet. However, if the identifier corresponding to the TCONT corresponding to the first fragmented packet does not include the cloud reassembly flag, the first OLT may continue to determine whether cloud reassembly needs to be performed on the first fragmented packet, that is, perform step 408.

It should be understood that the plurality of packets of the first packet may be transmitted in a same TCONT.

It can be understood that, usually, packet fragments needing to be reassembled in the cloud reassembly device may be marked by using a TCONT as a unit. For example, the cloud reassembly flag may be added to a TCONT 1, that is, the TCONT 1 is marked as requiring cloud reassembly. When the first OLT receives a fragmented packet transmitted in the TCONT 1, because the TCONT 1 is marked as requiring cloud reassembly, the first OLT sends the fragmented packet to the cloud reassembly device for reassembly.

It should be noted that an execution order of steps 404 to 406 is not limited in this application. Step 404 may be performed first, step 405 may be performed first, or step 406 may be performed first. This can be specifically adjusted based on an actual application scenario. In addition, in this embodiment of this application, a condition for determining, by the first OLT, whether the first fragmented packet needs to be reassembled in the cloud reassembly device is merely an example, and may include more or fewer determining conditions than those in steps 404 to 406. This can be specifically adjusted based on an actual application scenario.

407. The first OLT sends the first fragmented packet to the cloud reassembly device.

When the first OLT determines that the information about the first reassembly resource of the first OLT meets the second preset condition, or the first OLT determines that the first fragmented packet is not a management packet, or the first OLT determines that the identifier of the TCONT corresponding to the first fragmented packet includes the cloud reassembly flag, or the like, the first OLT sends the first fragmented packet to the cloud reassembly device, so that the cloud reassembly device reassembles the plurality of packet fragments of the first packet to obtain a complete second packet.

For a specific step in which the cloud reassembly device reassembles the plurality of packet fragments of the first packet, refer to the foregoing step 305. Details are not described herein again.

Figure 5A:
FIG. 5A is a schematic diagram of an encapsulation format in a data reassembly method according to an embodiment of this application.
Figure 5B:
FIG. 5B is a schematic diagram of another encapsulation format in a data reassembly method according to an embodiment of this application.

In a possible implementation, the first OLT may add a preset header to a fragmented packet to be sent to the cloud reassembly device, and then send the fragmented packet to the cloud reassembly device. The preset header may include information about the first fragmented packet, and may be specifically an Ethernet header or a user-defined header, or an encapsulation format of the preset header may be flexibly adjusted based on an actual scenario. For example, a format of an Ethernet encapsulation header may be shown in FIG. 5A, and an encapsulation format of user-defined encapsulation may be shown in FIG. 5B. The Ethernet encapsulation header may include a destination address (DA), a source address (SA), a PON tag (PON TAG), a packet type (T)/a packet length (length, L), a fragmented packet (namely, a GEM/XGEM frame) received by the first OLT, and a frame check sequence (FCS). A header of the user-defined encapsulation may include flexibly set data, for example, may include a DA, an ONU-ID (namely, an ONU identifier), a TCONT-ID (namely, a TCONT identifier), a Port-ID (namely, a GEM port identifier), a First/Last frame indication (which indicates whether the packet is a head frame packet or a tail frame packet), and the like.

It should be noted that the first OLT may alternatively not send the first fragmented packet to the cloud reassembly device after receiving the first fragmented packet, and send the plurality of packet fragments of the first packet to the cloud reassembly device for reassembly only after receiving the plurality of packet fragments corresponding to the first packet.

408. The first OLT determines whether cloud reassembly needs to be performed on the first fragmented packet, and if cloud reassembly needs to be performed on the first fragmented packet, performs step 407, or if cloud reassembly does not need to be performed on the first fragmented packet, performs step 409.

In the foregoing step 406, when the first OLT determines that the identifier corresponding to the TCONT corresponding to the first fragmented packet does not include the cloud reassembly flag, the first OLT may further determine whether the first fragmented packet needs to be reassembled in the cloud reassembly device. If the first fragmented packet needs to be reassembled in the cloud reassembly device, the first OLT sends the first fragmented packet to the cloud reassembly device for reassembly. If the first fragmented packet does not need to be reassembled in the cloud reassembly device, the first OLT locally reassembles the plurality of packet fragments of the first packet.

Specifically, that the first OLT determines that the fragmented packet of the first packet needs to be reassembled in the cloud reassembly device may specifically include: if a length of the first fragmented packet is greater than a first preset length, the first OLT determines that the first fragmented packet needs to be reassembled in a cloud device; or if a length of the first packet corresponding to the first fragmented packet is greater than a second preset length, the first OLT determines that the first fragmented packet needs to be reassembled in a cloud device, or the like. Alternatively, the first OLT may further continue to perform local statistical calculation on the information about the first reassembly resource of the first OLT. If the reassembly resource of the first OLT is insufficient, the first OLT determines that the first fragmented packet needs to be reassembled in the cloud device. It can be understood that, if an available reassembly resource of the first OLT can meet a resource required for reassembling the first fragmented packet, the first OLT may alternatively reassemble the first fragmented packet locally in the first OLT.

Generally, for a packet with a relatively small complete-packet length, because a quantity of packet fragments is relatively small, the first OLT may complete reassembly as soon as possible; for a packet with a relatively large complete packet-length, a quantity of packet fragments is relatively large, and the first OLT needs to wait for reassembly until all packet fragments are completely received. This occupies excessive buffer resources. Therefore, if the length of the first packet corresponding to the first fragmented packet is greater than the second preset length, the first fragmented packet may be sent to the cloud reassembly device for reassembly, to reduce a reassembly resource occupation rate of the first OLT, and improve efficiency in reassembling packet fragments by the first OLT.

409. After receiving the plurality of packet fragments of the first packet, the first OLT locally reassembles the plurality of packet fragments.

When the first OLT determines that the information about the first reassembly resource does not meet the second preset condition, or the packet type corresponding to the first fragmented packet is a management packet, or the like, the first OLT locally reassembles the plurality of packet fragments of the first packet to obtain the second packet.

In an optional implementation, before the first OLT locally reassembles the plurality of packet fragments of the first packet, the first OLT may determine whether a TCONT corresponding to the plurality of packet fragments of the first packet or the first fragmented packet includes the cloud reassembly flag, and if the TCONT includes the cloud reassembly flag, the first OLT removes the cloud reassembly flag.

Usually, the plurality of packet fragments of the first packet may be reassembled in the local CRB or a DDR memory of the first OLT. To reduce an amount of data reassembly in the DDR memory, the first OLT may use a large-capacity CRB. For example, a capacity of the CRB may be 64 M, 32 M, or the like, to improve an amount of packet fragments reassembled in the local CRB of the first OLT, and further reduce an amount of data reassembly performed in the DDR memory.

In some specific application scenarios, for example, in a common scenario such as home bandwidth, because there is relatively little uplink data and data packets with relatively small lengths are mainly used, the first OLT may directly complete reassembly of uplink data in the local CRB without transmitting the uplink data to the cloud reassembly device. In some scenarios in which there is relatively much uplink data, for example, a scenario in which there is relatively much uplink data such as video surveillance and a video call, the uplink data may be reassembled by using the local CRB reassembly in combination with the cloud reassembly device. For example, when the local reassembly resource of the first OLT is insufficient, packet fragments may be uploaded to the cloud reassembly device for reassembly, so that the first OLT does not need to comply with an extreme scenario design rule, so as to reduce costs of the first OLT, and greatly improve resource utilization. In addition, capacity expansion can be flexibly expanded for the cloud reassembly device, and even if the foregoing data amount is large, data reassembly can be normally performed, to avoid a packet loss caused by insufficient resources.

In this implementation of this application, after receiving the first fragmented packet, if an upload condition is met, the first OLT sends the first fragmented packet and another fragmented packet of the first packet to the cloud reassembly device for reassembly, or if the upload condition is not met, reassembly is performed locally in the first OLT. Therefore, whether the packet fragments need to be reassembled in the cloud reassembly device or reassembled in the local CRB may be determined based on different cases or conditions. Reducing an amount of data reassembly performed in the local DDR memory and reducing bandwidth occupation of the DDR memory can reduce a delay caused by access of packet fragments to the DDR memory, even without a need of reassembling packet fragments in the local DDR memory, thereby reducing power consumption of the first OLT. In addition, the first OLT manages only an on-chip buffer and queue, and does not need to manage reassembled data in the DDR memory, thereby improving work efficiency of the first OLT.

Scenario 2

Figure 6:
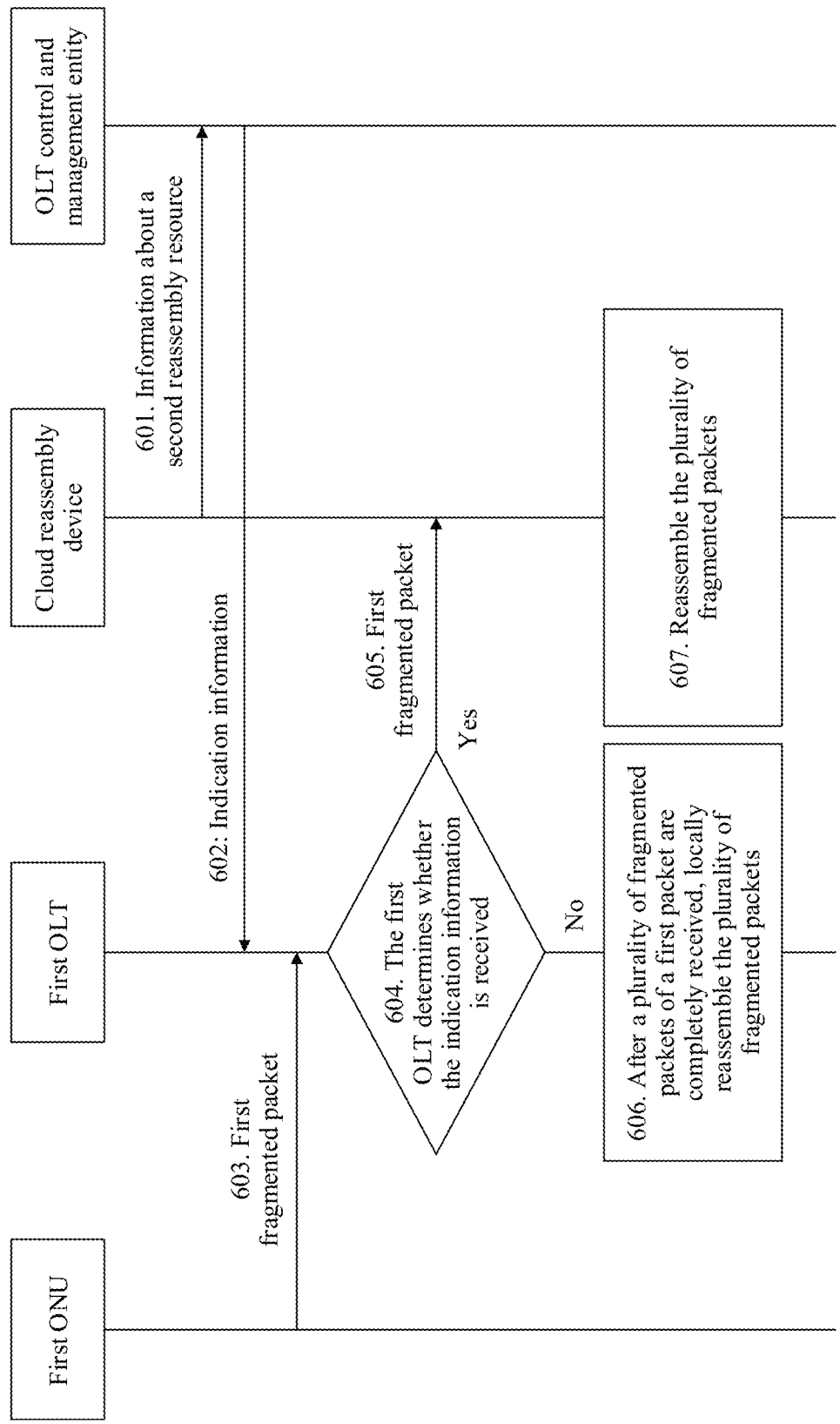
FIG. 6 is another schematic flowchart of a data reassembly method according to an embodiment of this application.

Refer to FIG. 6, which is a schematic flowchart of another data reassembly method provided in this application. The method is described as follows.

601. A cloud reassembly device sends information about a second reassembly resource to an OLT control and management entity.

The cloud reassembly device may send the information about the second reassembly resource to the OLT control and management entity, where the information about the second reassembly resource includes information about a usage status of a reassembly resource of the cloud reassembly device, information about an available reassembly resource, or the like.

The information about the second reassembly resource may include reassembly resource usage of the cloud reassembly device, the information about the available reassembly resource, or the like.

602. The OLT control and management entity sends indication information to a first OLT.

After the OLT control and management entity receives the information about the second reassembly resource fed back by the cloud reassembly device, if the OLT control and management entity determines, based on the information about the second reassembly resource, that the available reassembly resource of the cloud reassembly device is higher than a resource threshold or the reassembly resource usage of the cloud reassembly device is lower than a resource usage threshold, the OLT control and management entity may generate the indication information. The indication information is used to indicate the first OLT to send a plurality of packet fragments to the cloud reassembly device for reassembly.

It can be understood that, after the OLT control and management entity receives information about the second reassembly resource of the cloud reassembly device, if it is determined that the available reassembly resource of the cloud reassembly device is robust, the OLT control and management entity may notify, by using the indication information, the first OLT to send the packet fragments to the cloud reassembly device for reassembly.

Optionally, in a possible implementation, the OLT control and management entity may further receive information about a first reassembly resource sent by the first OLT, where the information about the first reassembly resource may include reassembly resource usage of the first OLT, an available buffer resource of the first OLT, and the like. The OLT control and management entity may further generate indication information with reference to the information about the first reassembly resource and the information about the second reassembly resource, so as to notify the first OLT to send the plurality of packet fragments to the cloud reassembly device for reassembly.

It can be understood that, the OLT control and management entity may generate the indication information based on the information about the first reassembly resource and the information about the second reassembly resource. When the available reassembly resource of the first OLT is insufficient, or the available reassembly resource of the cloud reassembly device is robust, the plurality of packet fragments may be sent to the cloud reassembly device for reassembly. When the available reassembly resource of the cloud reassembly device is insufficient, the OLT control and management entity does not need to send the indication information to the first OLT.

In a possible implementation, when the OLT control and management entity determines, based on the information about the second reassembly resource, that a used resource exceeds a third threshold, the OLT control and management entity generates alarm prompt information, where the alarm prompt information is used to prompt that the used resource of the OLT control and management entity exceeds the third threshold.

In addition, the OLT control and management entity may determine, with reference to the information about the first reassembly resource and the information about the second reassembly resource, whether used resources of the first OLT and the cloud reassembly device exceed the third threshold. If the used resources of the first OLT and the cloud reassembly device exceed the third threshold, the OLT control and management entity may generate alarm prompt information, so as to provide an alarm for available resources of the first OLT and the cloud reassembly device, and provide a capacity expansion prompt. For example, when resource usage of the first OLT and the cloud reassembly device reaches a particular proportion (for example, 70%, 80%, or 90%), the OLT control and management entity generates alarm prompt information, so as to prompt that available reassembly resources of the first OLT and the cloud reassembly device are insufficient, thereby reminding a user to expand the reassembly resources of the first OLT and the cloud reassembly device. In addition, for different levels of resource usage statuses, different levels of alarms may be provided. For example, when the resource usage of the first OLT and the cloud reassembly device reaches 70%, a minor alarm may be provided. When the resource usage of the first OLT and the cloud reassembly device reaches 80%, a moderate alarm can be provided. When the resource usage of the first OLT and the cloud reassembly device reaches 90%, a severe alarm may be provided, to remind the user to perform capacity expansion or other processing as soon as possible. Therefore, in the data reassembly method provided in this application, a cloud reassembly resource may be expanded, to increase reassembly resources. Compared with an existing solution in which only an OLT reassembles packet fragments and capacity expansion cannot be performed conveniently, this application greatly improves convenience of reassembly resource expansion.

Usually, in actual application, when the OLT control and management entity determines that the used resource of the cloud reassembly device or the used resources of the cloud reassembly device and the first OLT exceed the third threshold, the OLT control and management entity may generate alarm prompt information, so that the user learns that available reassembly resources of the cloud reassembly device or the cloud reassembly device and the first OLT are insufficient. Therefore, capacity expansion can be performed for the cloud reassembly device, or the cloud reassembly device and the first OLT, to increase available reassembly resources. Compared with an existing solution in which only local CRB reassembly or DDR reassembly of a first OLT can be performed and expansion cannot be conveniently performed based on reassembly resources required by to-be-reassembled packet fragments, in this application, the available reassembly resource of the cloud reassembly device can be dynamically monitored, to implement dynamic expansion of the available reassembly resource of the cloud reassembly device, thereby reducing a data packet loss rate of packet fragments caused by insufficient reassembly resources.

In a possible implementation, the OLT control and management entity further receives historical resource usage information sent by the first OLT, and determines information about a peak time period based on the historical resource usage information. The peak time period is a time period in which reassembly resource usage determined based on the historical resource usage information is higher than a fourth threshold or usage of one or more TCONTs is higher than a fifth threshold, or the like.

In a possible implementation, if there are a plurality of cloud reassembly devices, the OLT control and management entity may obtain information about a second reassembly resource of each cloud reassembly device in the plurality of cloud reassembly devices. The OLT control and management entity may generate indication information based on the information about the second reassembly resource of one or more of the plurality of cloud reassembly devices. The indication information may carry information about the one or more cloud reassembly devices, for example, a MAC address, an IP address, or an identifier, so that the first OLT may send the plurality of packet fragments to the cloud reassembly device for reassembly, or to one (which may be a specified cloud reassembly device or a randomly determined cloud reassembly device) of the plurality of cloud reassembly devices for reassembly.

Specifically, when there are a plurality of cloud reassembly devices, after obtaining the information about the second reassembly resource of each cloud reassembly device, the OLT control and management entity may determine, based on an available reassembly resource of each cloud reassembly device, one or more cloud reassembly devices whose available reassembly resources are greater than a sixth threshold, and generate indication information. The indication information carries information about the one or more cloud reassembly devices, so that the first OLT may send the plurality of packet fragments to the cloud reassembly device for reassembly, or to one of the plurality of cloud reassembly devices for reassembly. It can be understood that when there are a plurality of cloud reassembly devices, the OLT control and management entity may send, to the first OLT by using the indication information, information about a cloud reassembly device that can use a reassembly resource for reassembly, so that the first OLT may send the plurality of packet fragments to the cloud reassembly device that can use the reassembly resource for reassembly.

603. An ONU sends a plurality of packet fragments to the first OLT.

For step 603 in this application, refer to related descriptions in step 301. Details are not described herein again.

It should be noted that an execution order of step 602 and step 603 is not limited in this embodiment of this application. Step 602 may be performed first, or step 603 may be performed first. This can be specifically adjusted based on an actual application scenario.

604. The first OLT determines whether the indication information is received.

After receiving the plurality of packet fragments, the first OLT may further determine whether the indication information is received. If the first OLT receives the indication information, the first OLT sends the plurality of packet fragments to the cloud reassembly device, that is, performs step 605. If the first OLT has not received the indication information, the first OLT may locally reassemble the plurality of packet fragments, that is, performs step 606.

It should be noted that, after determining that the indication information is not received, the first OLT may perform step 606, and alternatively may continue to determine whether the plurality of packet fragments need to be sent to the cloud reassembly device. For details, refer to any step of the foregoing steps 402 to 408. Details are not described herein again.

605. If the indication information is received, the first OLT sends a first fragmented packet to the cloud reassembly device.

If the first OLT receives indication information indicating to send a plurality of packet fragments of a first packet to the cloud reassembly device, after the first OLT receives the first fragmented packet, the first OLT sends the first fragmented packet to the cloud reassembly device.

In addition, if the first OLT subsequently receives another fragmented packet of the first packet, the first OLT also sends the another received fragmented packet of the first packet to the cloud reassembly device.

606. If the first OLT has not received the indication information, the first OLT locally reassembles the plurality of packet fragments after the plurality of packet fragments of the first packet are completely received.

If the first OLT has not received the indication information indicating to send the plurality of packet fragments to the cloud reassembly device, the first OLT may locally reassemble the plurality of packet fragments of the first packet after the first OLT receives the plurality of packet fragments of the first packet.

In addition, if the first OLT has not received the indication information, the first OLT may continue to determine whether the plurality of packet fragments of the first packet need to be sent to the cloud reassembly device with reference to related descriptions in the foregoing steps 402 to 406 and step 408.

607. The cloud reassembly device reassembles the plurality of packet fragments of the first packet.

For steps 605 to 607 in this application, refer to related descriptions in the foregoing steps 303 to 305. The foregoing is merely a brief description, and details are not described.

In this implementation of this application, the OLT control and management entity may monitor the reassembly resource of the cloud reassembly device, and may obtain, in a timely manner, the cloud reassembly device that can use the reassembly resource for reassembly, so that the first OLT may send the to-be-reassembled packet fragments to the cloud reassembly device for reassembly. Alternatively, the first OLT may reassemble the packet fragments in the local CRB, to reduce a reassembly data amount in a local DDR memory, and reduce a delay caused by access of packet fragments to the DDR memory, even with no reassembly of packet fragments in the local DDR memory, thereby reducing power consumption of the first OLT. In addition, a location for reassembling packet fragments may be more flexibly determined further based on the reassembly resource of the cloud reassembly device, to improve efficiency in reassembling packet fragments.

Scenario 3

Figure 7:
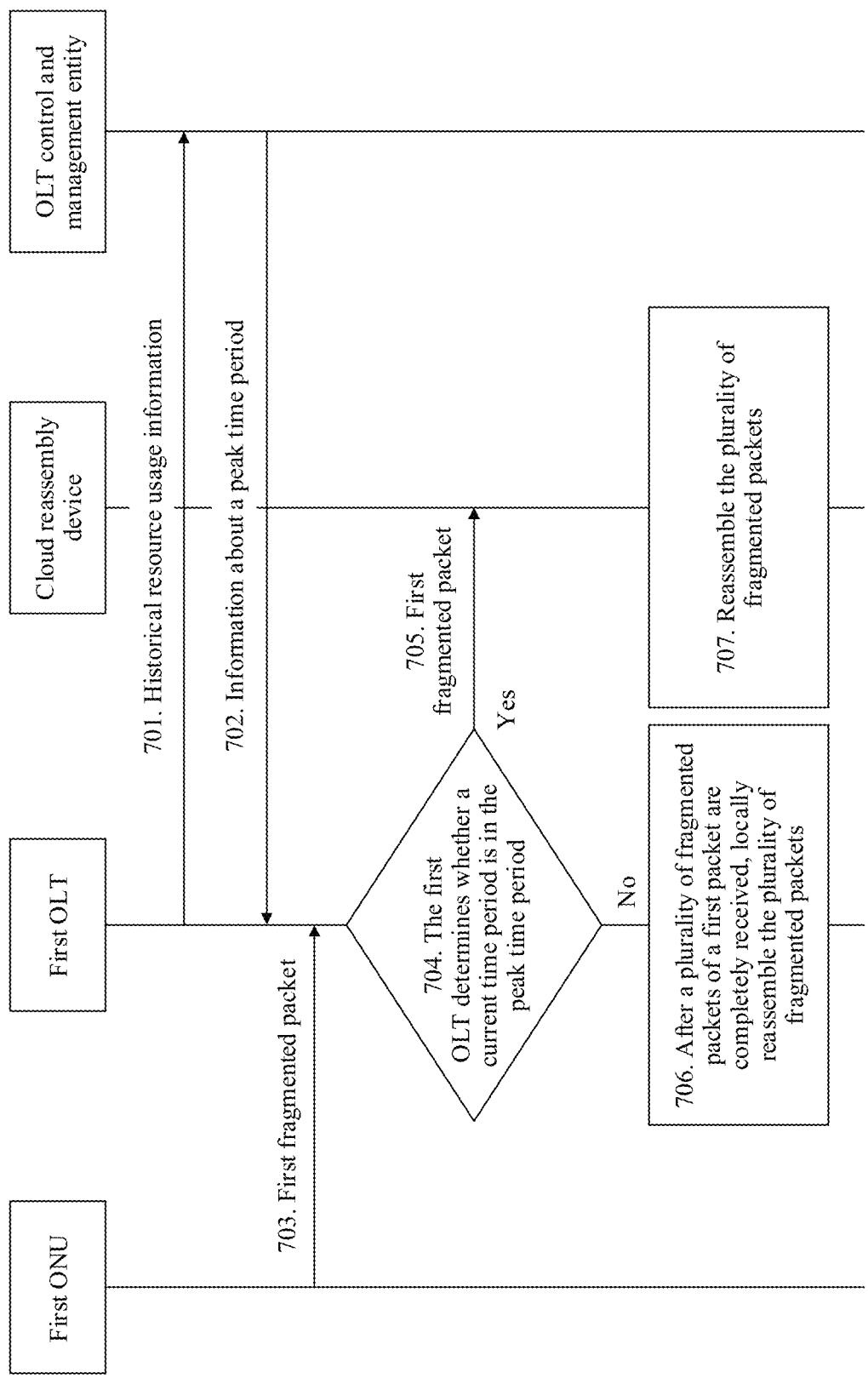
FIG. 7 is another schematic flowchart of a data reassembly method according to an embodiment of this application.

Refer to FIG. 7, which is a schematic flowchart of another data reassembly method provided in this application. The method is described as follows.

701. A first OLT sends historical resource usage information to an OLT control and management entity.

The historical resource usage information includes a historical resource usage status of the first OLT, for example, a historical resource consumption status of the first OLT in each time period, an available buffer resource, and historical usage information of each TCONT in one or more TCONTs connected to the first OLT, and the like.

Specifically, the first OLT may continuously collect statistics on reassembly resource usage of the first OLT, including reassembly resource usage in each time period, usage of each TCONT connected to the first OLT, a transmission status of an ultra-long packet that has a length greater than a length threshold and that is transmitted in each TCONT, and the like, and send the obtained historical resource usage information to the OLT control and management entity.

702. The OLT control and management entity sends information about a peak time period to the first OLT.

After receiving the historical resource usage information sent by the first OLT, the OLT control and management entity may analyze the historical resource usage information of the first OLT, determine a resource usage status of the first OLT in each time period, determine the peak time period, and send the information about the peak time period to the first OLT. The peak time period is a time period in which the reassembly resource usage determined based on the historical resource usage information is higher than a fourth threshold, or usage of one or more TCONTs is higher than a fifth threshold, or the like.

For example, the first OLT may send historical resource usage information that is within five days to the OLT control and management entity, and the OLT control and management entity may predict, through deep learning or another artificial intelligence (artificial intelligence, AI) algorithm or the like, a peak time period of resource usage of the first OLT. The peak time period may be understood as a time period in which reassembly resources of the first OLT are relatively few or the reassembly resource usage is relatively high.

In addition, the first OLT may also analyze the historical resource usage information by itself to determine the peak time period. A specific determining manner may be similar to an analysis manner of the OLT control and management entity. If the first OLT analyzes the historical resource usage information by itself to determine the peak time period, steps 701 to 702 do not need to be performed.

703. An ONU sends a first fragmented packet to the first OLT.

For step 703 in this application, refer to related descriptions in step 301. Details are not described herein again.

704. The first OLT determines whether a current time period is in the peak time period, and if the current time period is in the peak time period, performs step 705, or if the current time period is not in the peak time period, performs step 706.

After receiving the first fragmented packet, the first OLT determines whether the current time period is in the peak time period. If the current time period is in the peak time period, it indicates that the reassembly resource usage of the first OLT is relatively high, or available buffer resources of the first OLT are relatively few, or the like. In this case, the first OLT may send a plurality of packet fragments of a first packet to a cloud reassembly device for reassembly, that is, perform step 705. If the current time period is not in the peak time period, the first OLT may locally reassemble the plurality of packet fragments of the first packet, that is, perform step 706.

More specifically, if the information about the peak time period sent by the OLT control and management entity includes a time period in which usage of one or more TCONTs is higher than the fifth threshold, when receiving the first fragmented packet, the first OLT determines a TCONT for transmitting the first fragmented packet. If the TCONT is included in the one or more TCONTs, and the current time period is in the peak time period, the first OLT may send the plurality of packet fragments of the first packet to the cloud reassembly device.

It should be noted that, after determining that the current time period is not in the peak time period, the first OLT may perform step 706, and alternatively may continue to determine whether the first fragmented packet needs to be sent to the cloud reassembly device. For details, refer to any step of the foregoing steps 402 to 408. Details are not described herein again.

705. If indication information is received, the first OLT sends the first fragmented packet to the cloud reassembly device.

706. If the first OLT has not received the indication information, the first OLT locally reassembles the plurality of packet fragments after the plurality of packet fragments of the first packet are completely received.

707. The cloud reassembly device reassembles the plurality of packet fragments of the first packet.

For steps 705 to 707 in this application, refer to the foregoing steps 605 to 607. Details are not described herein again.

In this implementation of this application, the OLT control and management entity may analyze the peak time period of resource usage of the first OLT based on the historical resource usage information of the first OLT, determine the peak time period of resource usage of the first OLT, and notify the first OLT. If the first OLT receives the first fragmented packet in the peak time period, the first OLT may send the first fragmented packet and another fragmented packet of the first packet to the cloud reassembly device for reassembly. Therefore, the first OLT may send the to-be-reassembled packet fragments to the cloud reassembly device in the peak time period in a timely manner for reassembly, to improve efficiency in reassembling to-be-reassembled packet fragments. In addition, reducing an amount of data reassembly performed in a local DDR memory can reduce a delay caused by access of packet fragments to the DDR memory, even with no reassembly of packet fragments in the local DDR memory of the first OLT, thereby reducing power consumption of the first OLT.

The data reassembly method provided in this application is described above in detail. The following describes the apparatus provided in this application based on related descriptions of FIG. 1A to FIG. 7.

Figure 8:
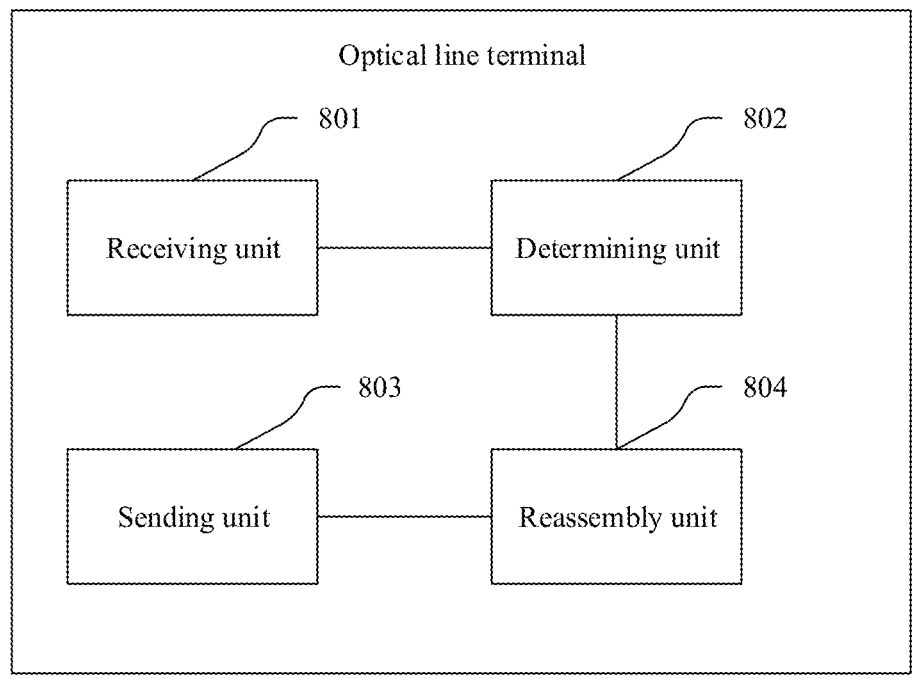
FIG. 8 is a schematic diagram of a structure of an optical line terminal according to an embodiment of this application.

Refer to FIG. 8. This application provides an optical line terminal, configured to perform the steps performed by the first OLT in FIG. 3 to FIG. 7. The optical line terminal may specifically include:
- a receiving unit 801, configured to receive a plurality of packet fragments of a first packet that are sent by an optical network unit ONU;
- a determining unit 802, configured to determine whether an upload condition is met; and
- a sending unit 803, configured to: after the determining unit 802 determines that the upload condition is met, send the plurality of packet fragments to a cloud reassembly device, so that after receiving the plurality of packet fragments, the cloud reassembly device reassembles the plurality of packet fragments to obtain a second packet.

In an optional implementation, the optical line terminal may further include:
- a reassembly unit 804, configured to: after the determining unit 802 determines that the upload condition is not met, reassemble the plurality of packet fragments to obtain the second packet.

In an optional implementation, the determining unit 802 is specifically configured to obtain information about the first packet; and determine that the information about the first packet meets a first preset condition.

In an optional implementation, the information about the first packet includes one or more of the following: identification information of a transmission container TCONT corresponding to the first packet, packet type information of the first packet, length information of the plurality of packet fragments, or length information of the first packet.

The first preset condition includes one or more of the following: an identifier corresponding to the transmission container TCONT corresponding to the first packet includes a cloud reassembly flag, a type of the first packet is not a management packet, a length of any fragmented packet in the plurality of packet fragments is greater than a first preset length, or a length of the first packet is greater than a second preset length.

In an optional implementation, the determining unit 802 is specifically configured to determine that information about a first reassembly resource of the first OLT meets a second preset condition.

In an optional implementation, the information about the first reassembly resource includes reassembly resource usage of the first OLT or buffer resource information of the first OLT, and the second preset condition includes:
- the reassembly resource usage of the first OLT is greater than a first threshold, or a buffer resource of the first OLT is less than a second threshold.

In an optional implementation, the determining unit 802 is specifically configured to determine that a current time period is in a peak time period.

In an optional implementation, the peak time period is obtained based on one or more of the following: historical usage information of each TCONT of one or more TCONTs connected to the first OLT, a historical resource consumption status of the first OLT, or received information about the peak time period sent by an OLT control and management entity.

In an optional implementation, the determining unit 802 is specifically configured to determine that indication information sent by the OLT control and management entity is received, where the indication information is used to indicate the first OLT to send the plurality of packet fragments to the cloud reassembly device.

In an optional implementation, the sending unit 803 is further configured to: before the determining unit 802 determines that the indication information sent by the OLT control and management entity is received, send the information about the first reassembly resource to the OLT control and management entity, where the first reassembly resource is used by the OLT control and management entity to obtain the indication information.

Figure 9:
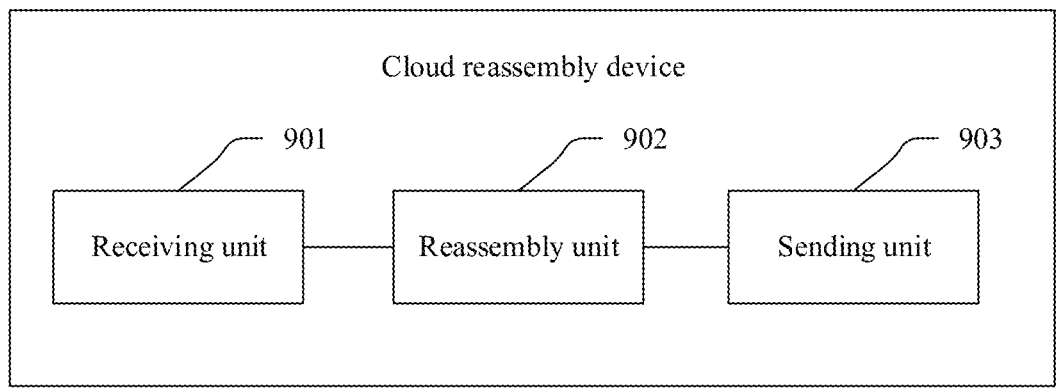
FIG. 9 is a schematic diagram of a structure of a cloud reassembly device according to an embodiment of this application.

This application further provides a cloud reassembly device. Refer to FIG. 9. The cloud reassembly device may include:
- a receiving unit 901, configured to receive a plurality of packet fragments of a first packet that are sent by a first OLT, where the plurality of packet fragments are sent to the cloud reassembly device after the first OLT determines that an upload condition is met; and
- a reassembly unit 902, configured to reassemble the plurality of packet fragments to obtain a second packet.

In an optional implementation, the cloud reassembly device further includes:
- a sending unit 903, configured to send information about a second reassembly resource of the cloud reassembly device to an OLT control and management entity, where the information about the second reassembly resource is used by the OLT control and management entity to generate indication information, and the indication information is used to indicate the first OLT to send the plurality of packet fragments to the cloud reassembly device.

Figure 10:
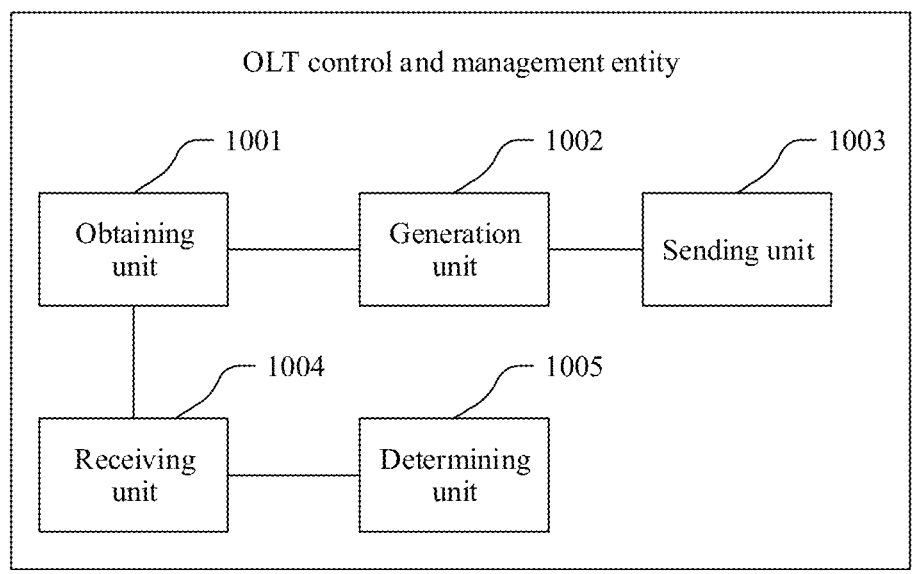
FIG. 10 is a schematic diagram of a structure of an OLT control and management entity according to an embodiment of this application.

This application further provides an OLT control and management entity. Refer to FIG. 10. The OLT control and management entity may include:
- an obtaining unit 1001, configured to obtain information about a second reassembly resource of a cloud reassembly device;
- a generation unit 1002, configured to generate indication information based on the information about the second reassembly resource; and
- a sending unit 1003, configured to send the indication information to a first OLT, where the indication information is used to indicate the first OLT to send a plurality of received packet fragments of a first packet to the cloud reassembly device, so that the cloud reassembly device reassembles the plurality of packet fragments to obtain a second packet.

In an optional implementation, the OLT control and management entity further includes a receiving unit 1004.

The receiving unit 1004 is configured to receive information about a first reassembly resource sent by the first OLT, where the information about the first reassembly resource includes information about a resource usage status of the first OLT.

The generation unit 1002 is specifically configured to generate the indication information based on the information about the first reassembly resource and the information about the second reassembly resource.

In an optional implementation:

the generation unit 1002 is further configured to generate alarm prompt information by the OLT control and management entity when it is determined, based on the information about the second reassembly resource, that a used resource exceeds a third threshold, where the alarm prompt information is used to prompt that the used resource of the cloud reassembly device exceeds the third threshold.

In an optional implementation, the OLT control and management entity further includes a determining unit 1005.

The determining unit 1005 is configured to determine information about a peak time period based on historical resource usage information of the first OLT.

The sending unit 1003 is further configured to send the information about the peak time period to the first OLT.

Figure 11:
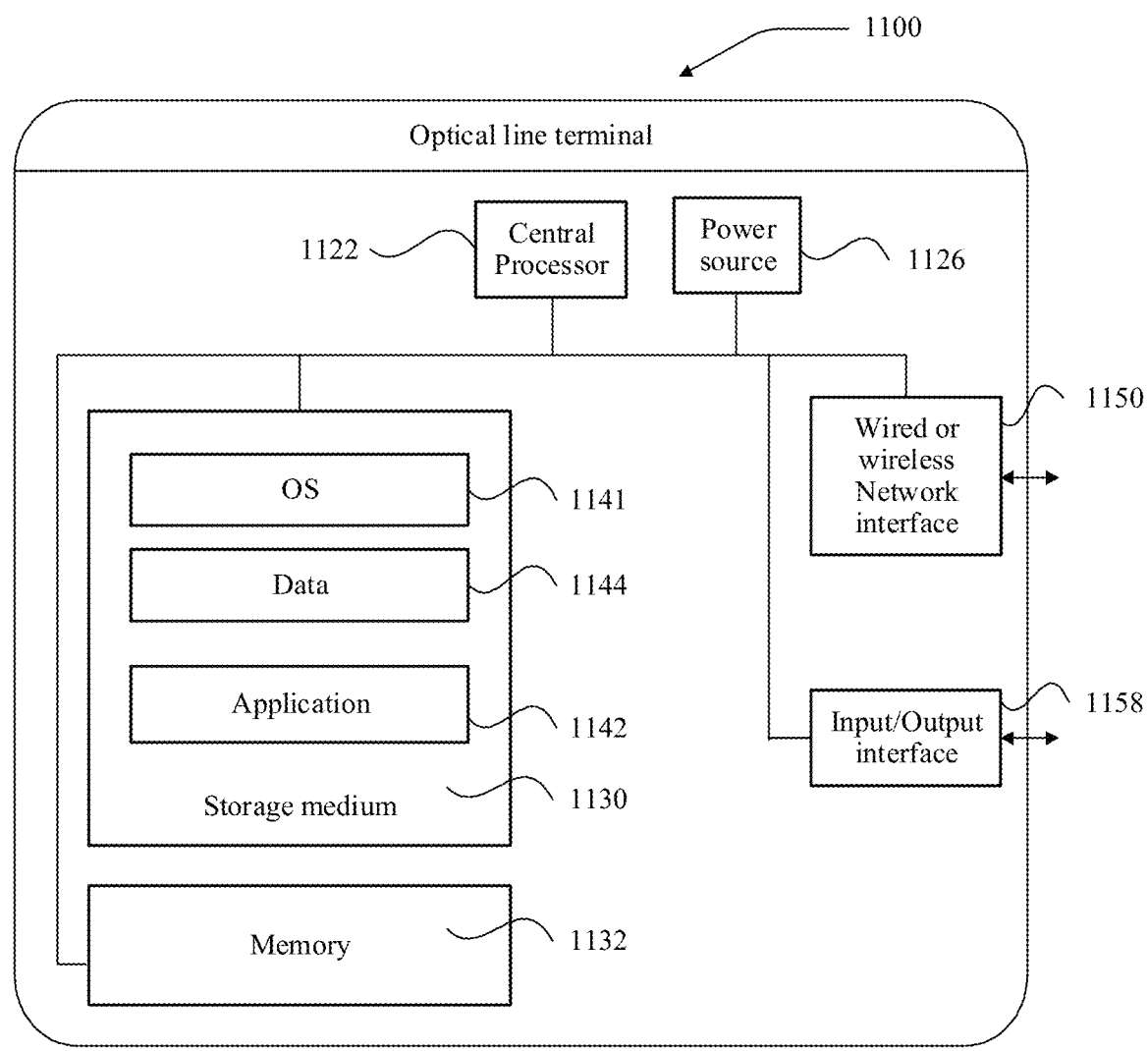
FIG. 11 is a schematic diagram of another structure of an optical line terminal according to an embodiment of this application.

FIG. 11 is a schematic diagram of a structure of an optical line terminal according to an embodiment of this application. The optical line terminal 1100 may vary greatly with a configuration or performance, and may include one or more central processing units (central processing units, CPU) 1122 (for example, one or more processors), a memory 1132, and one or more storage media 1130 (for example, one or more mass storage devices) storing an application program 1142 or data 1144. The memory 1132 and the storage medium 1130 may be transient storage or persistent storage. A program stored in the storage medium 1130 may include one or more modules (not shown in the figure), and each module may include a series of instruction operations on the optical line terminal. Further, the central processing unit 1122 may be configured to communicate with the storage medium 1130 and perform a series of instruction operations in the storage medium 1130 on the optical line terminal 1100.

The optical line terminal 1100 may further include one or more power supplies 1126, one or more wired or wireless network interfaces 1150, one or more input/output interfaces 1158, and/or one or more operating systems 1141 such as Windows Server™, Mac OS X™, Unix™, Linux™, and FreeBSD™.

Steps of the data reassembly method in embodiments corresponding to FIG. 3 to FIG. 7 may be performed based on the structure of the optical line terminal shown in FIG. 11.

Figure 12:
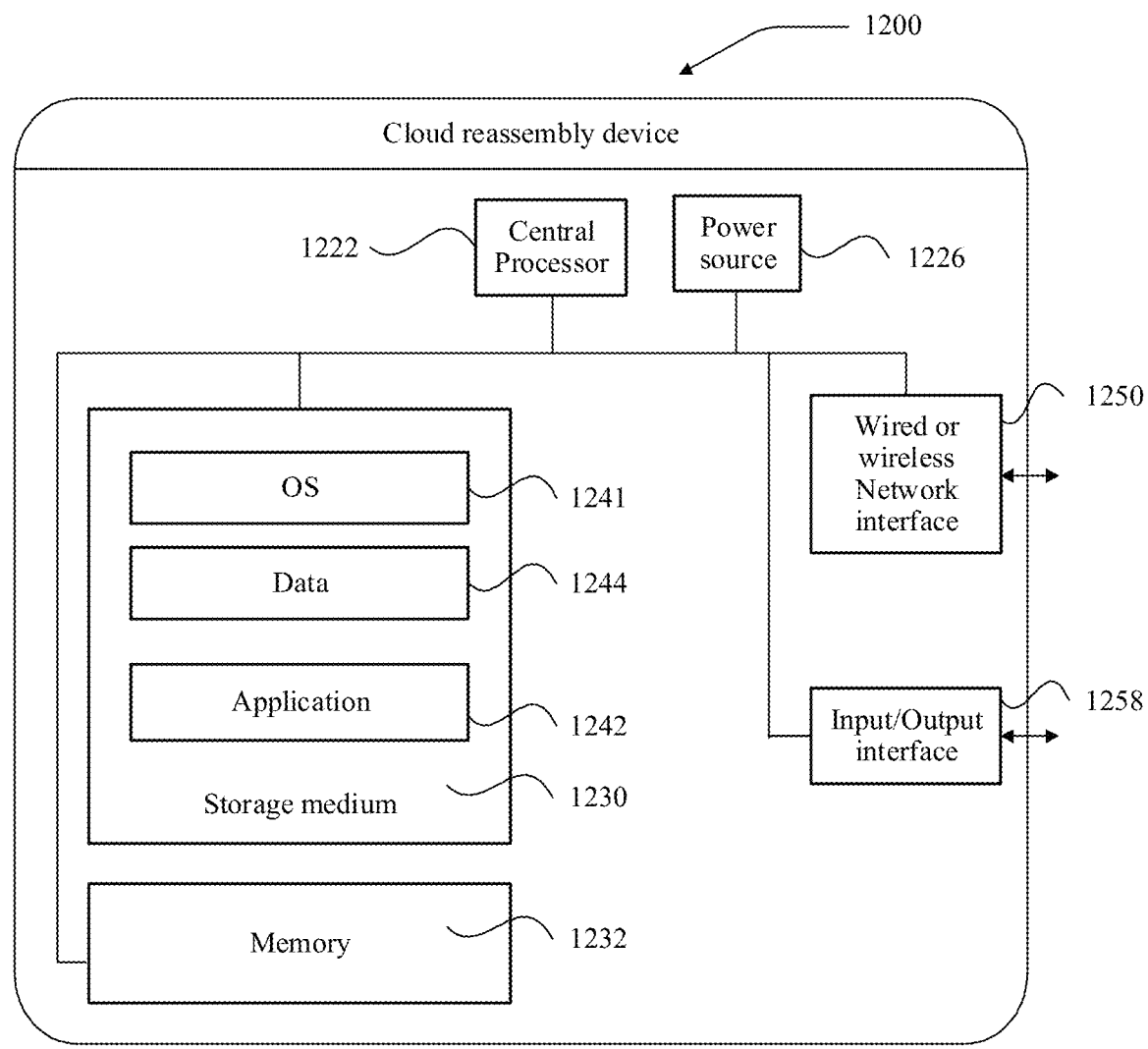
FIG. 12 is a schematic diagram of another structure of a cloud reassembly device according to an embodiment of this application.

FIG. 12 is a schematic diagram of a structure of a cloud reassembly device according to an embodiment of this application. The cloud reassembly device 1200 may vary greatly with a configuration or performance, and may include one or more central processing units (CPU) 1222 (for example, one or more processors), a memory 1232, and one or more storage media 1230 (for example, one or more mass storage devices) storing an application program 1242 or data 1244. The memory 1232 and the storage medium 1230 may be transient storage or persistent storage. A program stored in the storage medium 1230 may include one or more modules (not shown in the figure), and each module may include a series of instruction operations on the cloud reassembly device. Further, the central processing unit 1222 may be configured to communicate with the storage medium 1230, and perform a series of instruction operations in the storage medium 1230 on the cloud reassembly device 1200.

The cloud reassembly device 1200 may further include one or more power supplies 1226, one or more wired or wireless network interfaces 1250, one or more input/output interfaces 1258, and/or one or more operating systems 1241 such as Windows Server™, Mac OS X™ Unix™, Linux™, and FreeBSD™.

Steps of the data reassembly method in embodiments corresponding to FIG. 3 to FIG. 7 may be performed based on the structure of the cloud reassembly device shown in FIG. 12.

Figure 13:
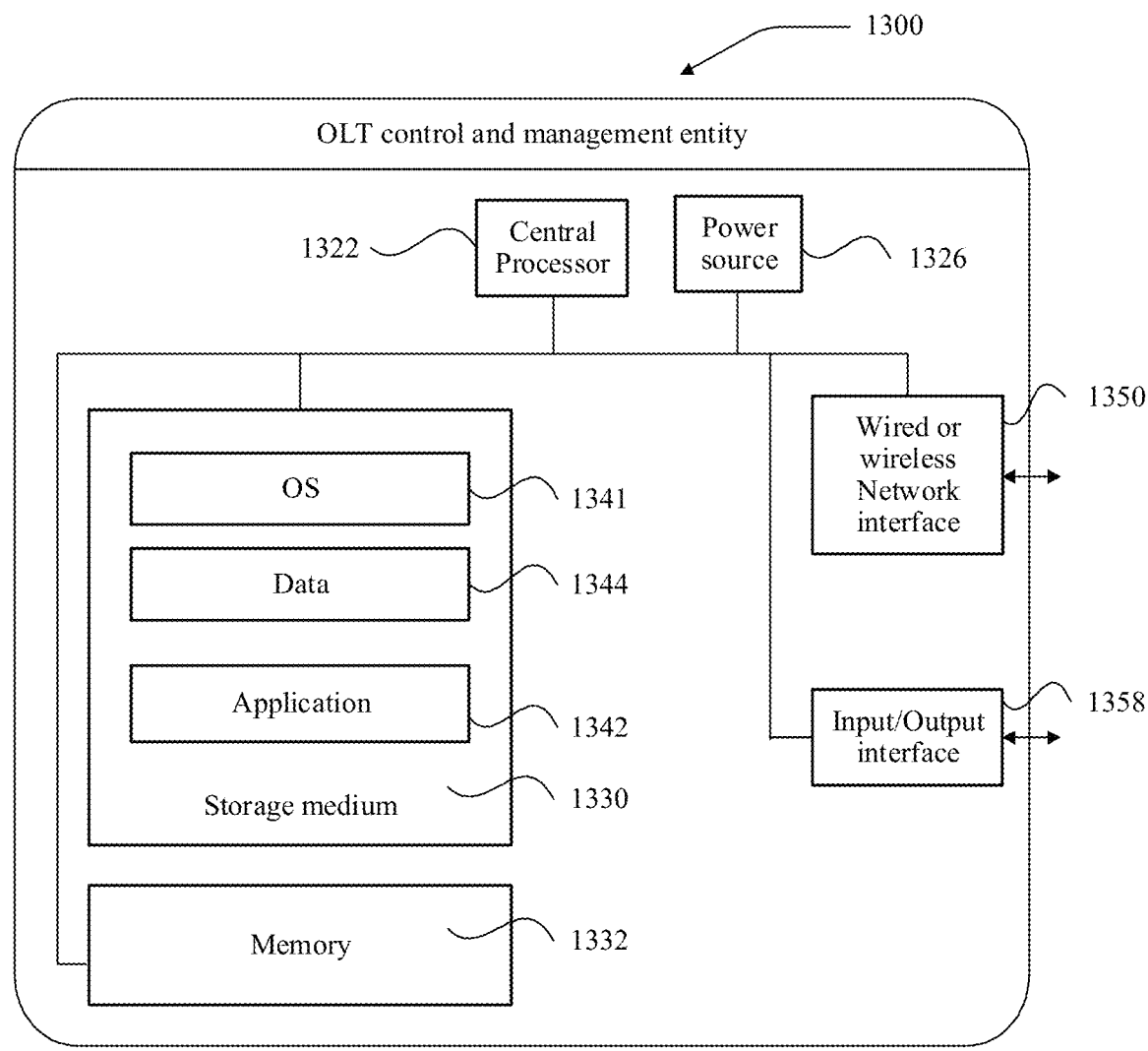
FIG. 13 is a schematic diagram of a structure of another OLT control and management entity according to an embodiment of this application.

FIG. 13 is a schematic diagram of a structure of an OLT control and management entity according to an embodiment of this application. The OLT control and management entity 1300 may vary greatly with a configuration or performance, and may include one or more central processing units (CPU) 1322 (for example, one or more processors), a memory 1332, and one or more storage media 1330 (for example, one or more mass storage devices) storing an application program 1342 or data 1344. The memory 1332 and the storage medium 1330 may be transient storage or persistent storage. A program stored in the storage medium 1330 may include one or more modules (not shown in the figure), and each module may include a series of instruction operations on the OLT control and management entity. Further, the central processing unit 1322 may be configured to communicate with the storage medium 1330, and perform a series of instruction operations in the storage medium 1330 on the OLT control and management entity 1300.

The OLT control and management entity 1300 may further include one or more power supplies 1326, one or more wired or wireless network interfaces 1350, one or more input/output interfaces 1358, and/or one or more operating systems 1341 such as Windows Server™, Mac OS X™, Unix™, Linux™, and FreeBSD™.

Steps of the data reassembly method in embodiments corresponding to FIG. 3 to FIG. 7 may be performed based on the structure of the OLT control and management entity shown in FIG. 13.

This application provides a data reassembly apparatus. The data reassembly apparatus may be applied to a device such as a first OLT, a cloud reassembly device, or an OLT control and management entity. The data reassembly apparatus is coupled to a memory, and is configured to read and execute instructions stored in the memory, so that the data reassembly apparatus is enabled to implement the steps of the method performed by the first OLT, the cloud reassembly device, or the OLT control and management entity in any one of embodiments corresponding to FIG. 3 to FIG. 7. In a possible design, the data reassembly apparatus is a chip or a system-on-a-chip.

This application provides a chip system. The chip system includes a processor, configured to support a first OLT, a cloud reassembly device, or an OLT control and management entity to implement functions related to the foregoing embodiments, for example, to send or process data and/or information related to the foregoing method. In a possible design, the chip system further includes a memory. The memory is configured to store necessary program instructions and data. The chip system may include a chip, or may include a chip and another discrete device.

In another possible design, when the chip system is a chip in a first OLT, a cloud reassembly device, an OLT control and management entity, or the like, the chip includes a processing unit and a communications unit. The processing unit may be, for example, a processor. The communications unit may be, for example, an input/output interface, a pin, or a circuit. The processing unit may execute computer executable instructions stored in a storage unit, so that the chip in the first OLT, the cloud reassembly device, the OLT control and management entity, or the like is enabled to perform the steps of the method performed by the first OLT, the cloud reassembly device, or the OLT control and management entity in any one of embodiments corresponding to FIG. 3 to FIG. 7. Optionally, the storage unit is a storage unit in the chip, such as a register or a cache. The storage unit may alternatively be a storage unit that is located outside the chip and that is in the first OLT, the cloud reassembly device, or the OLT control and management entity, such as a read-only memory (ROM), another type of static storage device capable of storing static information and instructions, a random access memory (RAM).

An embodiment of this application further provides a processor, configured to be coupled to a memory, and configured to perform the method and functions related to the first OLT in any one of the foregoing embodiments.

An embodiment of this application further provides a processor, configured to be coupled to a memory, and configured to perform the method and functions related to the cloud reassembly device in any one of the foregoing embodiments.

An embodiment of this application further provides a processor, configured to be coupled to a memory, and configured to perform the method and functions related to the OLT control and management entity in any one of the foregoing embodiments.

An embodiment of this application further provides a computer-readable storage medium. The computer-readable storage medium stores a computer program. When the computer program is executed by a computer, a method procedure related to the first OLT, the cloud reassembly device, or the OLT control and management entity in any one of the foregoing method embodiments is implemented. Correspondingly, the computer may be the foregoing first OLT, cloud reassembly device, or OLT control and management entity.

It should be understood that the processor mentioned in the first OLT, the cloud reassembly device, the OLT control and management entity, the chip system, or the like in the foregoing embodiments of this application, or the processor provided in the foregoing embodiments of this application may be a central processing unit (central processing unit, CPU), or may be another general purpose processor, a digital signal processor (digital signal processor, DSP), an application-specific integrated circuit (application-specific integrated circuit, ASIC), or a field programmable gate array (field programmable gate array, FPGA) or another programmable logic device, a discrete gate or a transistor logic device, a discrete hardware component, or the like. The general purpose processor may be a microprocessor or the processor may be any conventional processor or the like.

It should be further understood that, in the foregoing embodiments of this application, there may be one or more processors in the first OLT, the cloud reassembly device, the OLT control and management entity, the chip system, or the like, and may be adjusted based on an actual application scenario. An example is merely used for description herein, and no limitation is imposed. In the embodiments of this application, there may be one or more memories, and may be adjusted based on an actual application scenario. An example is merely used for description herein, and no limitation is imposed.

It should be further understood that in the embodiments of this application, the memory or the readable storage medium mentioned in the first OLT, the cloud reassembly device, the OLT control and management entity, the chip system, or the like in the foregoing embodiments may be a volatile memory or a non-volatile memory, or may include both volatile and non-volatile memories. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which serves as an external cache. By way of example but not limitative description, many forms of RAMs are available, such as a static random access memory (static RAM, SRAM), dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM) and a direct rambus random access memory (direct rambus RAM, DR RAM).

It should be further noted that, when the first OLT, the cloud reassembly device, or the OLT control and management entity includes a processor (or a processing unit) and a memory, the processor in this application may be integrated with the memory, or the processor may be connected to the memory through an interface, which may be adjusted based on an actual application scenario, and no limitation is imposed.

An embodiment of this application further provides a computer program or a computer program product including a computer program. When the computer program is executed on a computer, the computer is enabled to implement a method procedure of the first OLT, the cloud reassembly device, or the OLT control and management entity in any one of the foregoing method embodiments. Correspondingly, the computer may be the foregoing first OLT, cloud reassembly device, or OLT control and management entity.

The embodiments corresponding to FIG. 3 to FIG. 7 may be implemented entirely or partly by software, hardware, firmware, or any combination thereof, and may be implemented entirely or partly in a form of a computer program product when implemented by using software.

The computer program product includes one or more computer instructions. When the computer program instructions are loaded and executed on the computer, the procedure or functions described in the embodiments of this application are entirely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid State Disk (SSD)), or the like.

It may be clearly understood by those skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be another division in actual implementation. For example, a plurality of units or components may be combined or integrated into another system, or some features may be ignored or not performed. In addition, the displayed or discussed mutual couplings, or direct couplings, or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

If the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments corresponding to FIG. 3 to FIG. 7 in this application. The storage medium includes: any medium that can store program code, such as a USB flash drive, a removable hard disk, a read-only memory (ROM, Read-Only Memory), a random access memory (RAM, Random Access Memory), a magnetic disk, or an optical disc.

In the specification, claims, and accompanying drawings of this application, the terms "first", "second", and the like are intended to distinguish between similar objects but do not necessarily indicate a specific order or sequence. It should be understood that the terms used in this way may be interchanged in appropriate cases, and this is merely a manner of distinguishing between objects with a same attribute for description in the embodiments of this application. Moreover, the terms "including" and "with" and any variations thereof are intended to cover non-excluding inclusions so that a process, method, system, product, or device including a series of units is not necessarily limited to those units, but may include other elements not clearly listed or inherent to such a process, method, product or device.

Names of the message/frame/information, the module or the unit, and the like provided in the embodiments of this application are merely examples, and other names may be used, provided that functions of the message/frame/information, the module or the unit, and the like remain the same.

The terms used in the embodiments of this application are merely for the purpose of describing specific embodiments, but are not intended to limit the present invention. In the embodiments of this application, "a", "the mentioned", and "the" used in singular forms are also intended to include a plurality of forms unless the context clearly indicates other meanings. It should be further understood that, in the description of this application, unless otherwise indicated, "/" indicates that associated objects are in an "or" relationship. For example, A/B may indicate A or B. In this application, "and/or" is merely an association relationship describing associated objects, and indicates that three relationships may exist. For example, A and/or B may indicate that only A exists, both A and B exist, and only B exists. A and B each may be singular or plural.

Depending on the context, the word "if" or "in the case of" used herein may be interpreted as "while" or "when" or "in response to determining" or "in response to detection". Similarly, depending on the context, the phrase "if it is determined that" or "if (a stated condition or event) is detected" may be interpreted as "when it is determined that" or "in response to determining" or "when (a stated condition or event) is detected" or "in response to detection (of a stated condition or event).

In conclusion, the foregoing embodiments are merely intended to describe but not to limit the technical solutions of this application. Although this application is described in detail with reference to the foregoing embodiments, persons of ordinary skill in the art shall understand that they may still make modifications to the technical solutions described in the foregoing embodiments or make equivalent replacements to some technical features thereof, without departing from the scope of the technical solutions of the embodiments of this application.

What is claimed is:

1. A data reassembly method, comprising:
receiving, by a first optical line terminal (OLT), a plurality of packet fragments of a first packet sent by an optical network unit (ONU);
when an upload condition has been met, sending, by the first OLT, the plurality of packet fragments to a cloud reassembly device for reassembly into a second packet; or
when the upload condition has not been met, reassembling, by the first OLT, the plurality of packet fragments to obtain the second packet; and
wherein information about a first reassembly resource of the first OLT meets a second preset condition, and the information about the first reassembly resource comprises reassembly resource usage of the first OLT or buffer resource information of the first OLT, and the second preset condition comprises the reassembly resource usage of the first OLT is greater than a first threshold, or a buffer resource of the first OLT is less than a second threshold.

2. The method according to claim 1, wherein that the first OLT determines that an upload condition has been met comprises:
the first OLT obtains information about the first packet; and
the first OLT determines that the information about the first packet meets a first preset condition.

3. The method according to claim 2, wherein the information about the first packet comprises one or more of the following: identification information of a transmission container (TCONT) corresponding to the first packet, packet type information of the first packet, length information of the plurality of packet fragments, or length information of the first packet; and
the first preset condition comprises one or more of the following:
an identifier corresponding to the transmission container (TCONT) corresponding to the first packet comprises a cloud reassembly flag, a type of the first packet is not a management packet, a length of any fragmented packet in the plurality of packet fragments is greater than a first preset length, or a length of the first packet is greater than a second preset length.

4. The method according to claim 1, wherein that the first OLT determines that an upload condition has been met comprises:
the first OLT determines that a current time period is in a peak time period.

5. The method according to claim 4, wherein the peak time period is obtained based on one or more of the following: historical usage information of each TCONT of one or more TCONTs connected to the first OLT, a historical resource consumption status of the first OLT, or received information about the peak time period sent by an OLT control and management entity.

6. The method according to claim 1, wherein that the first OLT determines that an upload condition has been met comprises:
the first OLT determines that indication information sent by the OLT control and management entity is received, wherein the indication information is used to indicate the first OLT to send the plurality of packet fragments to the cloud reassembly device.

7. The method according to claim 6, wherein before the first OLT determines that the upload condition has been met, the method further comprises:
sending, by the first OLT, the information about the first reassembly resource to the OLT control and management entity, wherein the first reassembly resource is used by the OLT control and management entity to obtain the indication information.

8. An optical line terminal (OLT), comprising:
a non-transitory memory storing instructions; and
at least one processor in communication with the memory, the at least one processor configured, upon execution of the instructions, to perform the following steps:
receiving a plurality of packet fragments of a first packet sent by an optical network unit (ONU);
when an upload condition has been met, sending the plurality of packet fragments to a cloud reassembly device for reassembly into a second packet; or
when the upload condition has not been met, reassembling the plurality of packet fragments to obtain the second packet;
wherein:
the first OLT determines that an upload condition has been met further comprises:
information about a first reassembly resource of the first OLT meets a second preset condition,
the information about the first reassembly resource comprises reassembly resource usage of the first OLT or buffer resource information of the first OLT, and the second preset condition comprises:
the reassembly resource usage of the first OLT is greater than a first threshold, or a buffer resource of the first OLT is less than a second threshold.

9. The OLT according to claim 8, wherein that the OLT determines that an upload condition has been met comprises:
obtaining information about the first packet; and
determining that the information about the first packet meets a first preset condition.

10. The OLT according to claim 9, wherein the information about the first packet comprises one or more of the following: identification information of a transmission container (TCONT) corresponding to the first packet, packet type information of the first packet, length information of the plurality of packet fragments, or length information of the first packet; and
the first preset condition comprises one or more of the following:
an identifier corresponding to the transmission container TCONT corresponding to the first packet comprises a cloud reassembly flag, a type of the first packet is not a management packet, a length of any fragmented packet in the plurality of packet fragments is greater than a first preset length, or a length of the first packet is greater than a second preset length.

11. The OLT according to claim 8, wherein that the first OLT determines that an upload condition has been met comprises:
the first OLT determines that a current time period is in a peak time period.

12. A non-transitory computer-readable storage medium storing instructions that, when the instructions are executed by at least one processor, the instructions cause the at least one processor to:
receive a plurality of packet fragments of a first packet sent by an optical network unit (ONU); and
when an upload condition has been met, send the plurality of packet fragments to a cloud reassembly device for reassembly into a second packet; or
when the upload condition has not been met, reassemble the plurality of packet fragments to obtain the second packet;
wherein:
the information about the first reassembly resource comprises reassembly resource usage of the first OLT or buffer resource information of the first OLT, and information about a first reassembly resource of the first OLT meets a second preset condition,
the second preset condition comprises:
the reassembly resource usage of the first OLT is greater than a first threshold, or a buffer resource of the first OLT is less than a second threshold.

13. The computer-readable storage medium according to claim 12, wherein the instructions further cause the at least one processor to:
obtain information about the first packet; and
determine that the information about the first packet meets a first preset condition.

14. The computer-readable storage medium according to claim 13, wherein the information about the first packet comprises one or more of the following: identification information of a transmission container (TCONT) corresponding to the first packet, packet type information of the first packet, length information of the plurality of packet fragments, or length information of the first packet; and
- the first preset condition comprises one or more of the following:
- an identifier corresponding to the transmission container (TCONT) corresponding to the first packet comprises a cloud reassembly flag, a type of the first packet is not a management packet, a length of any fragmented packet in the plurality of packet fragments is greater than a first preset length, or a length of the first packet is greater than a second preset length.

* * * * *